United States Patent
Yin et al.

(10) Patent No.: US 12,306,324 B2
(45) Date of Patent: May 20, 2025

(54) METHODS AND SYSTEM FOR COLLABORATIVE LOCAL POSITIONING

(71) Applicant: Huawei Technologies Co., Ltd., Shenzhen (CN)

(72) Inventors: Xiaotian Yin, Addison, TX (US); Jian Li, Addison, TX (US); Yucen Liu, Addison, TX (US)

(73) Assignee: Huawei Technologies Co., Ltd., Shenzhen (CN)

(*) Notice: Subject to any disclaimer, the term of this patent is extended or adjusted under 35 U.S.C. 154(b) by 355 days.

(21) Appl. No.: 17/857,934

(22) Filed: Jul. 5, 2022

(65) Prior Publication Data

US 2022/0342030 A1    Oct. 27, 2022

Related U.S. Application Data

(63) Continuation of application No. PCT/US2020/012984, filed on Jan. 9, 2020.

(51) Int. Cl.
*G01S 5/14* (2006.01)
*G01S 5/00* (2006.01)
*G01S 5/02* (2010.01)

(52) U.S. Cl.
CPC .......... *G01S 5/0289* (2013.01); *G01S 5/0072* (2013.01); *G01S 5/14* (2013.01)

(58) Field of Classification Search
CPC ...................................................... G01S 5/0289
USPC ........................................................ 455/456.1
See application file for complete search history.

(56) References Cited

U.S. PATENT DOCUMENTS

| | | | |
|---|---|---|---|
| 9,451,399 B2* | 9/2016 | Park | H04J 11/0063 |
| 2008/0102855 A1* | 5/2008 | Forbes | G01S 5/0289 455/456.1 |
| 2017/0356979 A1* | 12/2017 | Georgiou | H04W 4/023 |
| 2020/0025853 A1* | 1/2020 | Sadiq | H04L 27/2613 |
| 2022/0342030 A1* | 10/2022 | Yin | G01S 1/68 |

* cited by examiner

*Primary Examiner* — Qutbuddin Ghulamali
(74) *Attorney, Agent, or Firm* — Conley Rose, P.C.

(57) ABSTRACT

Collaborative local positioning techniques, such as could be used with smart phones, surveying equipment, or other mobile devices, are described. The techniques include independent techniques for distance measurement between devices, the relative positioning of devices, and an absolute orienting of the devices without use of fixed anchor points and through on-will participation of the devices to provide privacy. Distances between devices are determined by use of a sequence of positioning signals, such as a magnetic signal, each of which include an identifier of the transmitting device, the amplitude of the signal as transmitted, and the position of the signal within the sequence. The amplitude of the positioning signal as received can be compared to the amplitude as transmitted to obtain a distance.

20 Claims, 19 Drawing Sheets

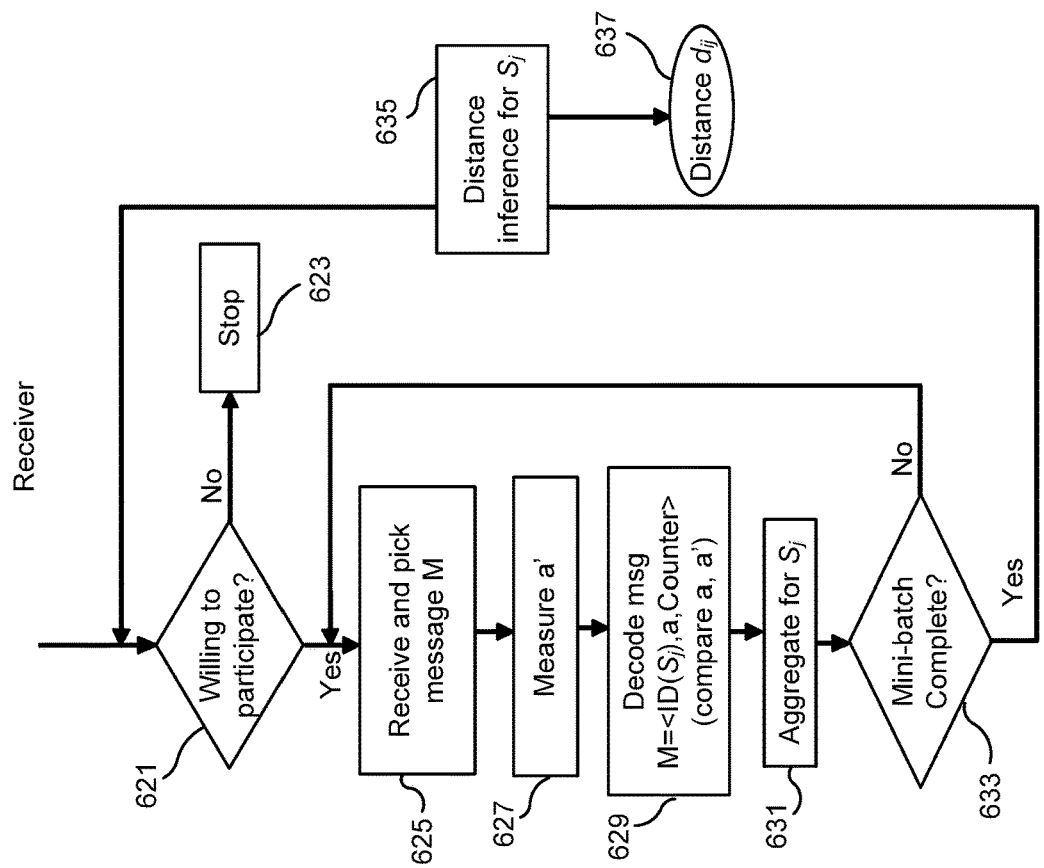
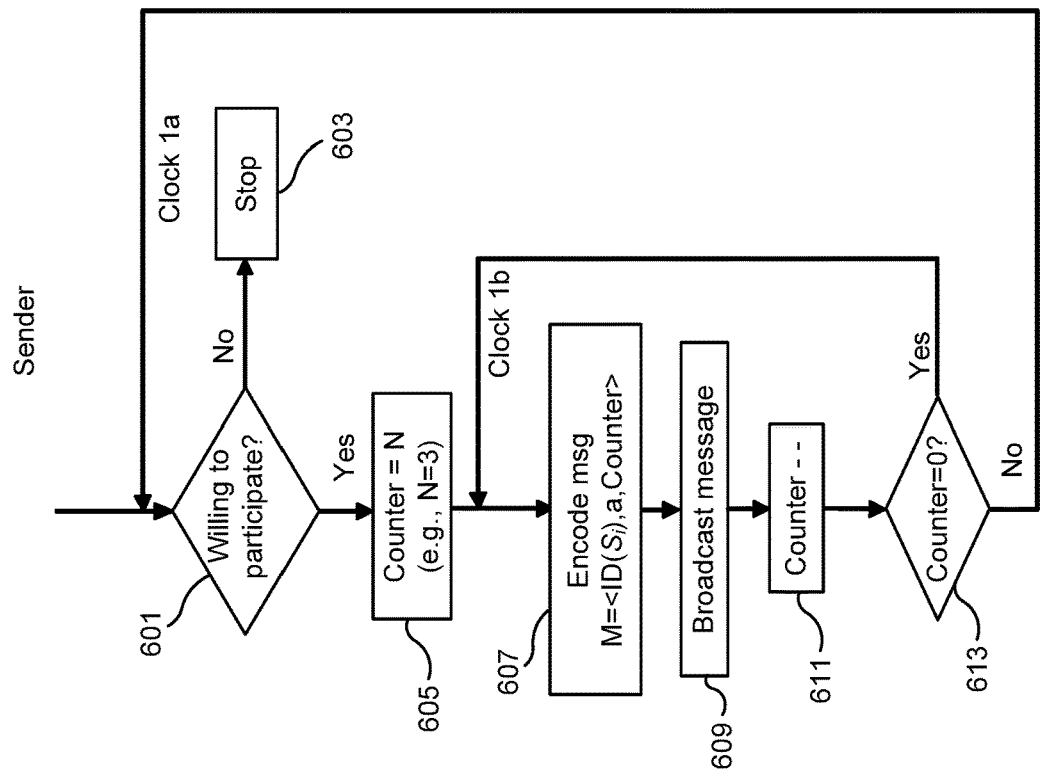
FIG. 6B
FIG. 6A

At time t₂

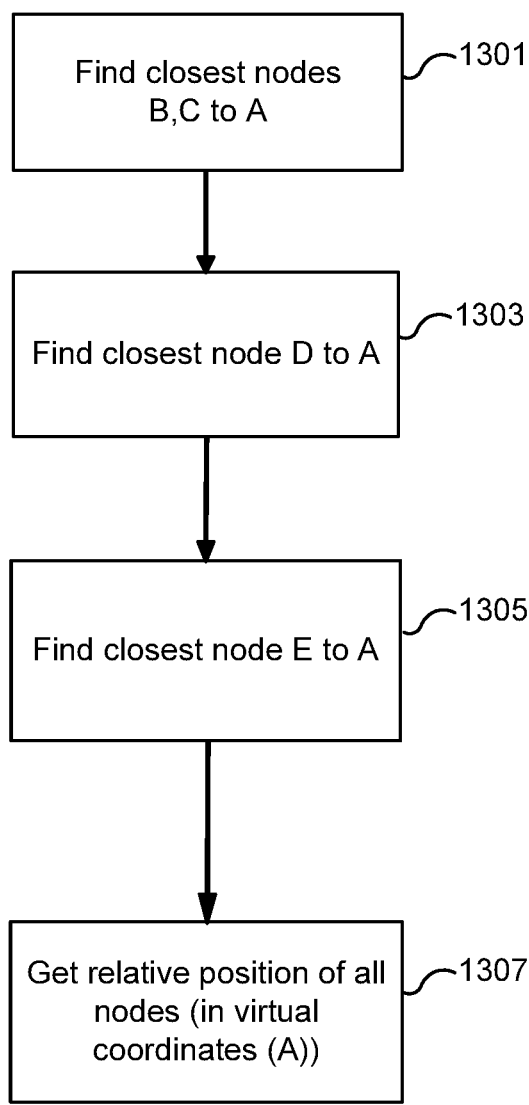
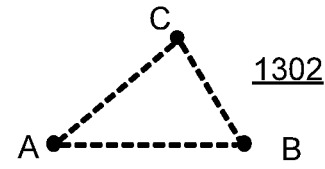
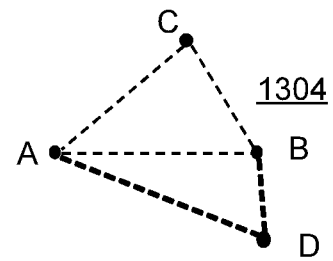
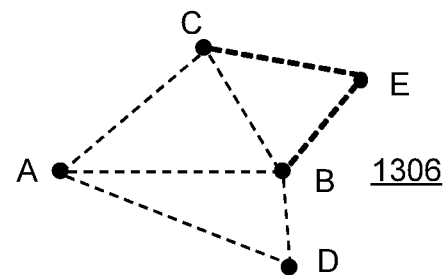
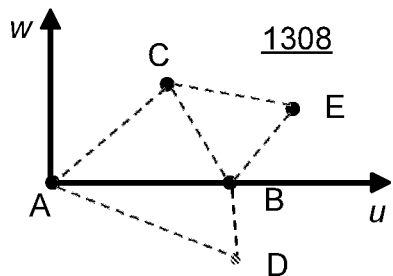
FIG. 13A    FIG. 13B

Image matching

METHODS AND SYSTEM FOR COLLABORATIVE LOCAL POSITIONING

CROSS-REFERENCE TO RELATED APPLICATIONS

This patent application is a continuation of International Application No. PCT/US2020/012984 filed on Jan. 9, 2020, by Futurewei Technologies, Inc., and titled "Methods and System for Collaborative Local Positioning," which is hereby incorporated by reference.

TECHNICAL FIELD

The disclosure generally relates to techniques that can be used for the local positioning of electronic devices.

BACKGROUND

Positioning is employed by many electronic devices and applied to a many applications. Examples include positioning functions on applications found on smart phones, surveying equipment, and Global Positioning Satellite (GPS) based devices. FIG. 1A illustrates an example of a positioning system that is local, in that it does not use of GPS. In FIG. 1A a user node 101, that can be a mobile device such as smart phone or surveying equipment (e.g., a distance finding theodolite), is to have its position determined. This can be done by determining the distances between the mobile device 101 and a set of fixed anchor or reference stations, three of which (111, 113, 115) are shown in FIG. 1A, at known positions. From these distances, triangulation or multilateration can be used to determine the location of the mobile device 101, where three or more reference stations can be used to determine its two-dimensional position and four or more points to determine is three dimensional position. The computation of the position can be performed on the mobile device 101 itself, or it can gather the distances and provide these to a laptop computer or other device to perform the computation.

The local positioning arrangement illustrated in FIG. 1A can have a number of limitations in practice. A first of these is that the locations of the anchors or reference stations 111, 113, 115 need to be known and such anchor points are often not available; and even in cases where these are known, such as in surveying, it is often an involved process to establish the required reference stations.

Another limitation is that the line-of-sight path between the mobile device 101 and a reference station 111 may become blocked for some locations of the mobile device 101, as presented by the blockage X in FIG. 1A. Such a blockage can occur in optical ranging devices, such as for the laser beams employ by surveying equipment, as well for some types of electronic signals. Such line-of-sight blockages can reduce accuracy of the positioning or even make positioning impossible.

A further limitation can arise from multipath error, an effect that can be illustrated with respect to FIG. 1B. In FIG. 1B a transmit antenna 121 is located some distance away from a receive antenna 123. For example, the transmit antenna 121 and receive antenna 123 could respectively belong to reference station 111 and mobile device 101 of FIG. 1A. The signal from the transmit antenna 121 travels by a line-of-sight path to the receive antenna 123, but the signal can reflect of the ground (as shown in FIG. 1B) or other surface to provide a multipath component. A multipath component may experience some amount of attenuation relative to the line-of-sight signal, but still be of comparable amplitude; and if there is blockage in the line-of-sight path, the multipath component may be of greater amplitude that the line-of-sight signal. Consequently, the presence of multipath signals and difficulty in removing their effects can complicate local positioning.

SUMMARY

According to a first aspect of the present disclosure, a positioning system includes a first mobile device having one or more receivers and one or more processors coupled to the one or more receivers. The receivers are configured to receive sequences of positioning signals from one or more additional devices. Each sequence of positioning signals includes a plurality of signals each including an identifier of the additional device from which the signal is transmitted, an indication of an amplitude of the signal as transmitted by the additional device, and a count value designating position of the signal within the sequence of positioning signals. The one or more processors are configured to: receive a first sequence of positioning signals from a first of the additional devices; determine an amplitude of each positioning signal of the first sequence as received at the first mobile device; for each of the received positioning signals of the first sequence, compare the determined amplitude of the positioning signal as received with the indication of the amplitude of the signal as transmitted; and determine from the comparing for each of the received positioning signals of the first sequence a distance from the first mobile device to the first of the additional devices.

Optionally, in a second aspect and in furtherance of the first aspect, the first mobile device can also include one or more transmitters configured to transmit control signals to the one or more additional devices. The receivers are further configured to receive control signals from one or more additional mobile devices. The one or more processors are coupled to the one or more transmitters and further configured, prior to receiving the first sequence of positioning signals from the first of the additional devices, to: receive a first request from the first of the additional devices to accept sequences of positioning signals therefrom; and transmit a reply to the first request accepting reception of sequences of positioning signals from the first of the additional devices.

Optionally, in a third aspect and in furtherance of the preceding aspects, the first mobile device also includes one or more transmitters configured to transmit sequences of positioning signals each including a plurality of signals each including an identifier of the first mobile device, an indication of the amplitude of the signal as transmitted by the first device, and a count value designating position of the signal within the sequence of positioning signals.

Optionally, in a fourth aspect and in furtherance of the third aspect, the positioning system further includes a second mobile device, the first of the additional devices being the second mobile device. The second mobile device includes one or more transmitters configured to transmit the first sequence.

Optionally, in a fifth aspect and in furtherance of the fourth aspect, the second mobile device also includes one or more receivers configured to receive sequences of positioning signals transmitted by the first mobile device and one or more processors coupled to the one or more receivers and configured to receive the sequences of positioning signals transmitted by the first mobile device and determine therefrom a distance to the first mobile device.

Optionally, in a sixth aspect and in furtherance of the fourth aspect, the positioning system of claim 4, further includes a third mobile device with one or more transmitters configured to transmit a second sequence of positioning signals. The one or more receivers of the first mobile device are further configured to receive the second sequence and the one or more processors of the first mobile device are further configured to determine from the second sequence a distance from the first mobile device to the third mobile device.

Optionally, in a seventh aspect and in furtherance of the sixth aspect, the one or more transmitters of the first mobile device are further configured to transmit to the second mobile device the distance from the first mobile device to the third mobile device and to transmit to the third mobile device the distance from the first mobile device to the second mobile device.

Optionally, in an eighth aspect and in furtherance of the sixth aspect, the one or more receivers of the first mobile device is further configured to receive from one or both of the second and third mobile devices a distance between the second mobile device and the third mobile device. The one or more processors of the first mobile device are further configured to determine the relative positions of the first mobile device, the second mobile device and the third mobile device from the distance from the first mobile device to second mobile device, the distance from the first mobile device to third mobile device, and the distance between the second mobile device and the third mobile device.

Optionally, in a ninth aspect and in furtherance of the eighth aspect, the one or more processors of the first mobile device are further configured to determine an absolution position of the first mobile device, the second mobile device and the third mobile device.

Optionally, in a tenth aspect and in furtherance of the ninth aspect, the one or more processors of the first mobile device are configured to determine the absolution position of the first mobile device, the second mobile device and the third mobile device by matching a position of the first mobile device to an absolution position.

Optionally, in an eleventh aspect and in furtherance of the ninth aspect, wherein the first mobile device further includes a camera connected to the one or more processors of the first mobile device, wherein the one or more processing processors of the first mobile device are configured to determine the absolution position of the first mobile device, the second mobile device and the third mobile device based on an image from the camera.

Optionally, in a twelfth aspect and in furtherance of the preceding aspects, the sequence of positioning signals is a magnetic signal.

Optionally, in a thirteenth aspect and in furtherance of the preceding aspects, the sequence of positioning signals is a Bluetooth signal.

Optionally, in a fourteenth aspect and in furtherance of the preceding aspects, the first mobile device is a mobile telephone.

Optionally, in a fifteenth aspect and in furtherance of the preceding aspects, the first mobile device is a surveying device.

Optionally, in a sixteenth aspect and in furtherance of the preceding aspects, the first mobile device is a drone.

Optionally, in a seventeenth aspect and in furtherance of the preceding aspects, the first mobile device is a robotic device.

Optionally, in an eighteenth aspect and in furtherance of the preceding aspects, the first mobile device is an inventory tracking device.

According to another aspect of the present disclosure, a method for position determination method includes receiving, at a first mobile device, a first sequence of positioning signals including a plurality of signals. Each of the signals includes an identifier of a second mobile device from which the signal is transmitted, an indication of an amplitude of the signal as transmitted by the second mobile device, and a count value designating position of the signal within the sequence of positioning signals. The method also includes determining an amplitude of each positioning signal of the first sequence as received at the first mobile device; for each of the received positioning signals of the first sequence, comparing the determined amplitude of the positioning signal as received with the indication of the amplitude of the signal as transmitted; and determining from the comparing for each of the received positioning signals of the first sequence a distance between the first mobile device and the second mobile device.

According to another aspect of the present disclosure, a positioning system includes multiple mobile devices. Each of the mobile devices includes a transmitter, a receiver, and one or more processors coupled to the transmitter and the receiver. The transmitter is configured to transmit a sequence of positioning signals including a plurality of positioning signals each including an identifier of the mobile device, an indication of an amplitude of the signal as transmitted, and a count value designating position of the signal within the sequence of positioning signals. The receiver is configured receive the sequence of positioning signals from others of the plurality of mobile devices. The one or more processors are configured to determine an amplitude of each of the positioning signals of a received sequence, perform for each positioning signal of the received sequence a comparison of the determined amplitude of the positioning signal as received with the indication of the amplitude as transmitted, and determine from the comparisons a distance between the mobile device receiving the sequence of positioning signals and the mobile device transmitting the sequence of positioning signals.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures.

FIG. 6A is a flowchart of one embodiment of the operation of a mobile device or node as a sender in a collaborative distance measuring process.

FIG. 6B is a flowchart of one embodiment of the operation of a mobile device or node as a receiver in a collaborative distance measuring process.

FIGS. 13A and 13B consider the positioning process of FIG. 12 in more detail.

DETAILED DESCRIPTION

The present disclosure will now be described with reference to the figures, which in general relate to a collaborative local positioning system that can be used by mobile nodes, does not depend upon fixed anchoring points, provides privacy through on-will participation, and can overcome light-of-sight blocks between devices.

More specifically, the following presents embodiments of a mobile device that can be used cooperatively with other such devices to measure the pair-wise distances between the devices. From the distances, embodiments of the mobile device can determine the relate positioning of the set of devices. Embodiments for the mobile device can also fix the orientation of the devices and establish their orientation. The presented embodiments use a collaborative approach in which each mobile device, or node, can function the same, without the need for anchors and with the ability to bypass blockages. Embodiments can use on-will participation and broadcast to provide privacy and reduce the number of communications. The ability to perform relative positioning is decoupled from absolute positioning, which can be performed without anchors.

Figure 1A:
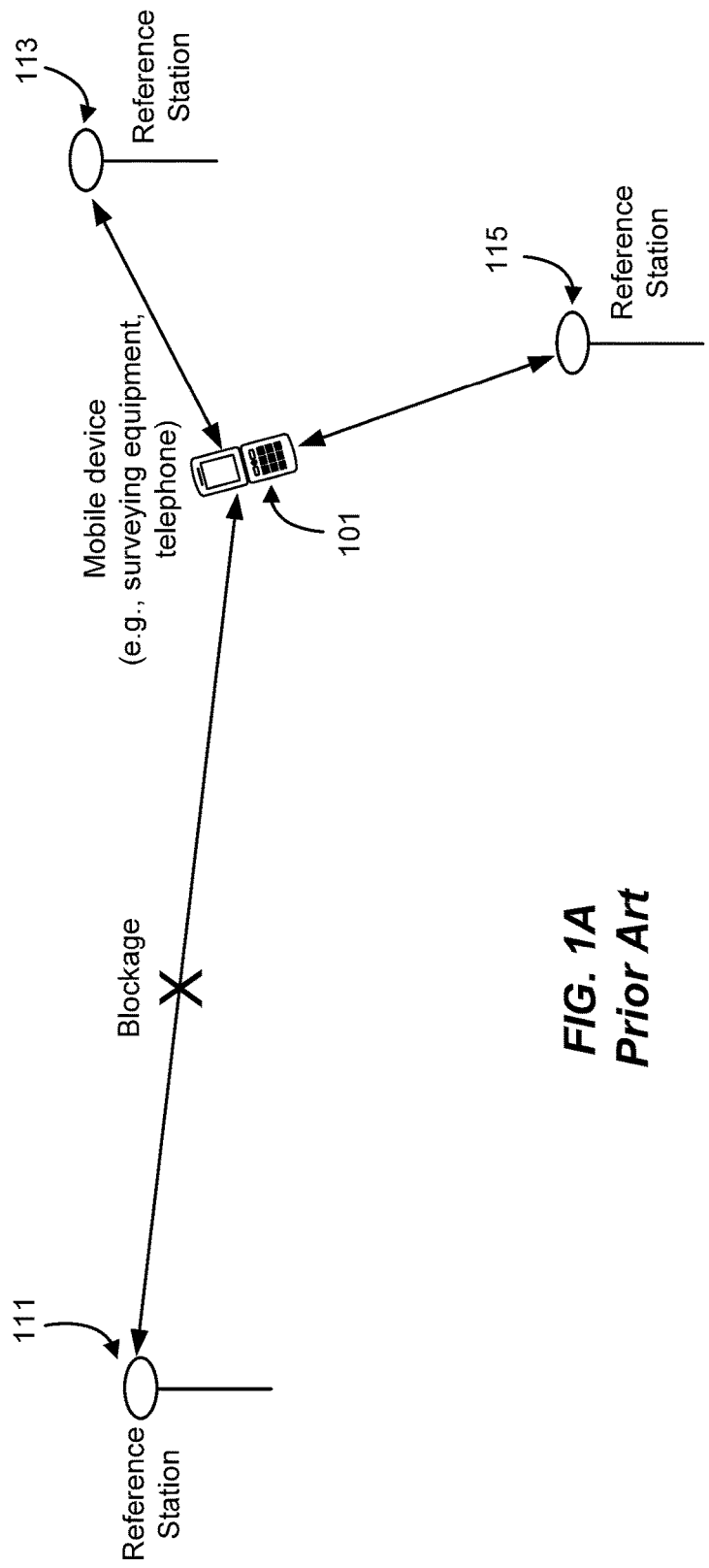
FIG. 1A illustrates an example of a local positioning system.
Figure 1B:
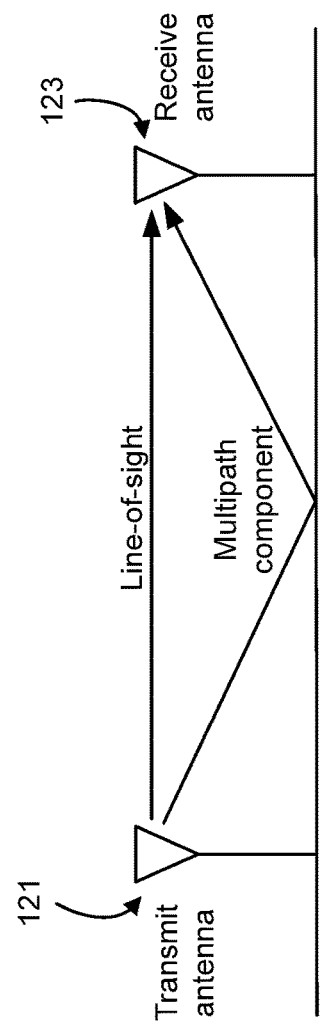
FIG. 1B illustrates how multipath error can arise.
Figure 2:
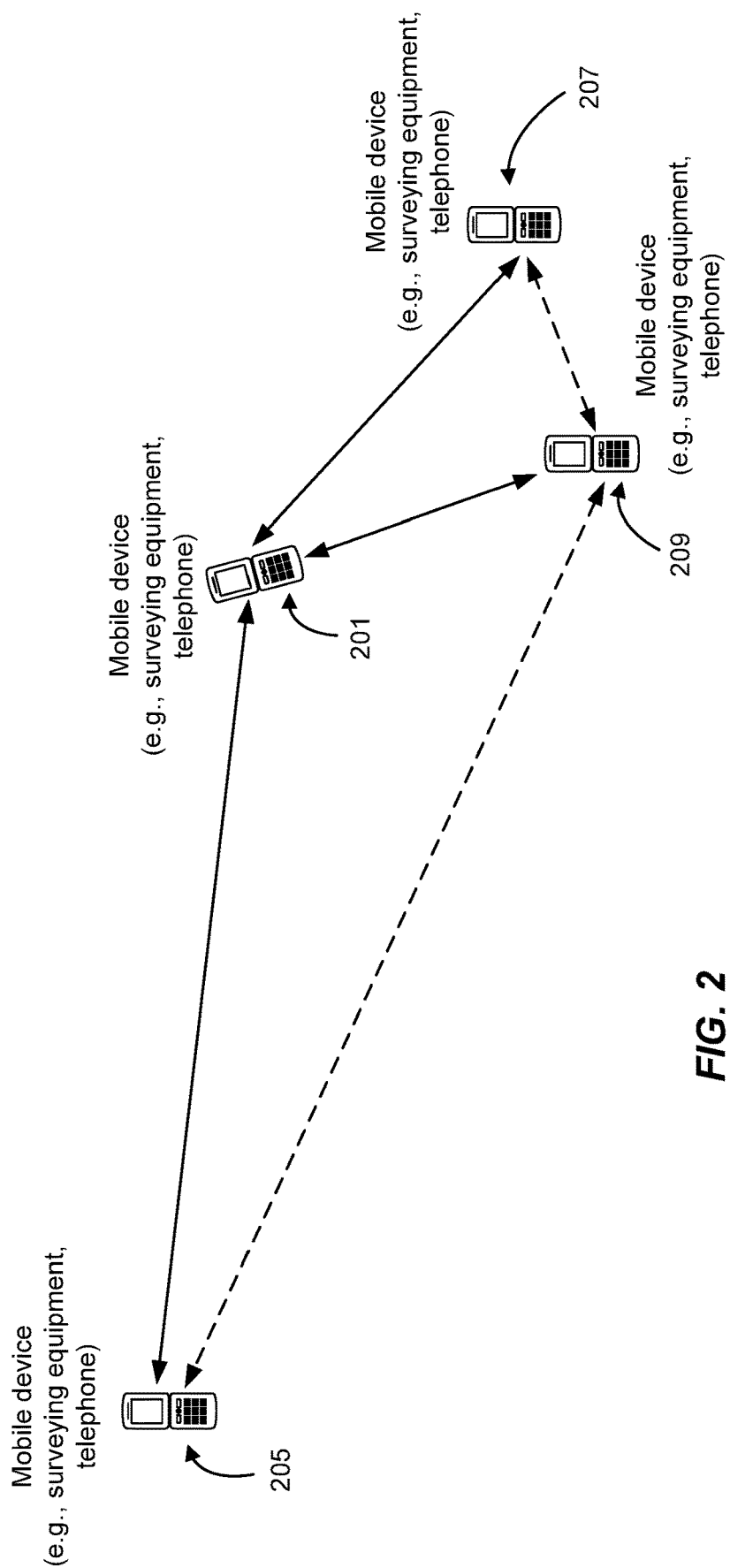
FIG. 2 illustrates one embodiment for a system of mobile devices that can be used for collaborative local positioning.

FIG. 2 illustrates one embodiment for a system of mobile devices 201, 205, 207, 209, such as the shown smart phones or surveying equipment. The mobile devices can be of the same device type or of different device types, as long as they can interact with one another as described in the following. In the following discussion, the mobile devices will often be referred to as "nodes" and the portions of the discussion will often be presented from the perspective of a particular node or "self", such as the mobile device 201. The mobile device 201 can exchange the signals described below with the other nodes 205, 207, and 209 (as shown by the solid lines) and the other nodes 205, 207, and 209 can also exchange signals between themselves (as shown by the broken lines). FIG. 2 shows four devices, but various numbers can be used, although when using triangulation or multilateration to determine the location of the mobile device 201, three or more devices can be used to determine its two-dimensional position and four or more devices to determine is three dimensional position.

Although the nodes of FIG. 2 are illustrated as telephones, the described embodiments can be applied to a number uses besides the smart phone and surveying applications already mentioned. Within the mobile telephone context, in addition to use in positioning applications such as can be used to locate a smart phone's position, the distancing aspects could be used to issue an alarm whenever the phone/device is within some distance (e.g., 10 feet or 3 meters) in order to find the device. Another use can be in virtual reality or augmented reality applications to locate the physical positions of objects or devices from their virtual positions. For another example, the techniques can be used in wireless charging applications for locating the device to be charged, such as when the wireless power receiver is located in a human body or otherwise occluded. Still another use to which the described local positioning techniques can be applied is to an array of drones, robotics, or other moving devices, so that they can perform relative positioning or physical positioning without relying upon known anchors or positioning stations. Yet another use to which the techniques can be applied is in warehouse tracking devices, such as an inventor tracking device, or racks that are moving, occulated, or both.

Figure 3:
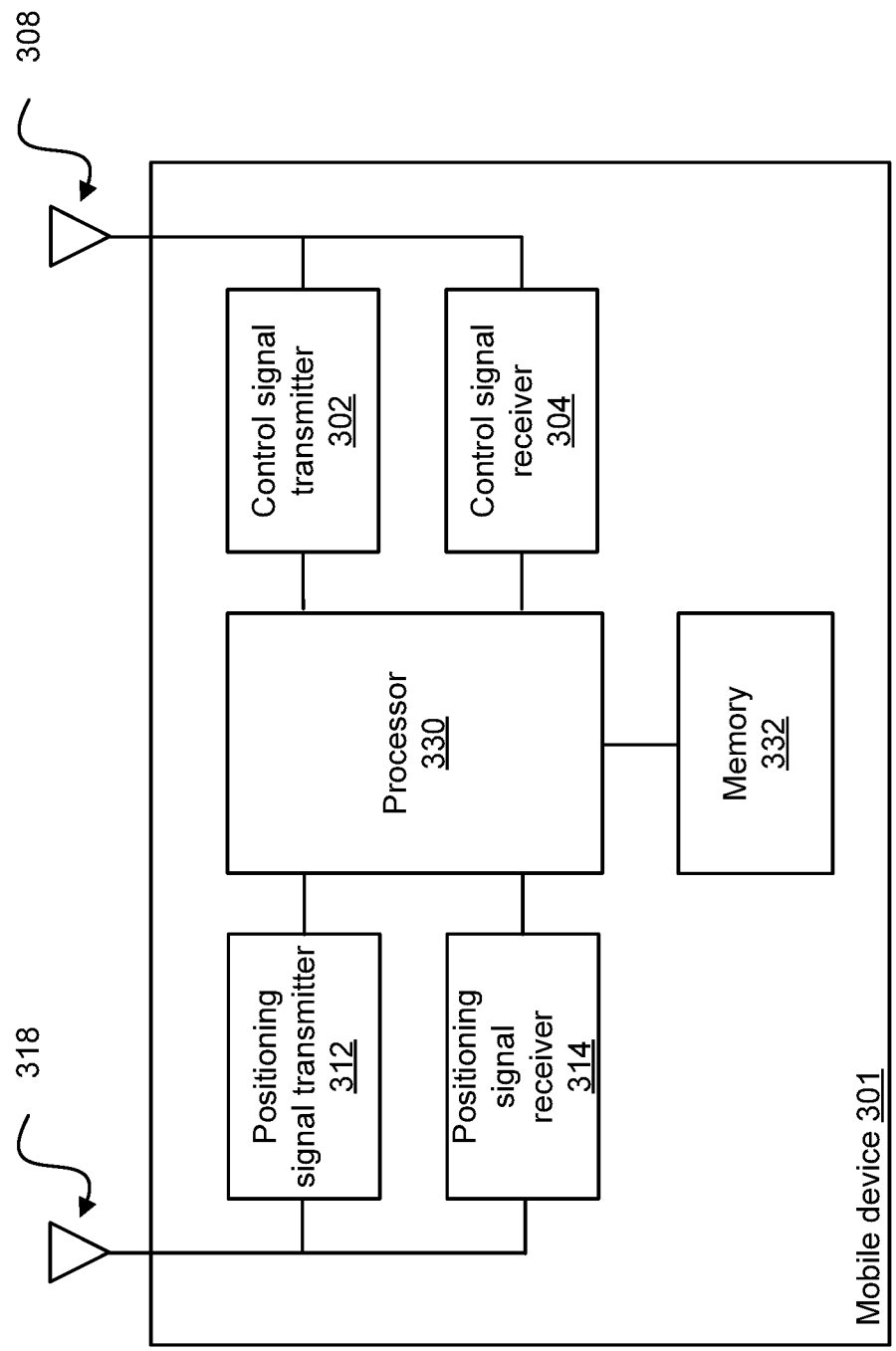
FIG. 3 is a block diagram of one embodiment for a mobile device with which the described local positioning techniques can be used.

FIG. 3 is a block diagram of one embodiment for a mobile device 301 or node in which the described local positioning techniques can be used. To be able to exchange control signals, such as a willingness to detect or be detected by another device, the mobile device 301 includes a control signal antenna 308 connected to a control signal transmitter 302 and a control signal receiver 304. Each of the control signal transmitter 302 and a control signal receiver 304 can be implemented as hardware, software, firmware, or combinations of these. For example, in some embodiments each of control signal transmitter 302 and control signal receiver 304 could be Application-Specific Integrated Circuits (ASICs), while in other embodiments these could be implemented in software by the one or more processing circuits of processor 330 discussed more below. In the shown embodiment, both the control signal transmitter 302 and the control signal receiver 304 share a common antenna 308, but in other embodiments separate antennas could be used for the transmit channel and receive channel. Although the control signal transmitter 302 and the control signal receiver 304 are shown as separate, in many implementations these will share elements or even be a combined transceiver. A number of different embodiments can be used for the control signal channel, such as Bluetooth or various types of RF signals.

To transmit and receive positioning signals, the mobile device 301 includes a positioning signal antenna 318 connected to a positioning signal transmitter 312 and a positioning signal receiver 314, where the positioning signal transmitter 312 and the positioning signal receiver 314 can again be implemented in hardware, software, firmware, or various combinations of these. In this embodiment, both the positioning signal transmitter 312 and the positioning signal receiver 314 share a common antenna 318, but in other embodiments separate antennas could be used for the transmit channel and receive channel. Although the positioning signal transmitter 312 and the positioning signal receiver 314 are shown as separate, in many implementations these will share elements or even be a combined transceiver. A number of different embodiments can be used for the control signal channel, such as a sequence of magnetic signals or Bluetooth signals. Depending on the embodiment, the control signals and positioning signals can be of different types, such as using magnetic signals for positioning and Bluetooth for control signals, or the same type of signals can be used for both, such as using Bluetooth signals for both control and positioning, in which case the transmitting, receiving and antenna components can be shared between the control and positioning channels. The signals can be chosen to permit local positioning over various distances, such as for distances of 10 meters or less.

The transmitters 302 and 312 and the receivers 304, 314 are connected to one or more processors, such as processor 330, of one or more processing circuits or modules configured to perform the local positioning operations described below. The circuitry of the processing circuitry of the processor 330 can perform these functions through hardware, software, firmware and various combinations of these, depending on the embodiment. The processor 330 is connected to a memory (or memories) 332 that can be used to store data associated with the local positioning operations as well as for instructions. In addition to elements shown in FIG. 3 that are related to the local positioning functions, a mobile device 301 will typically have a number of elements related to other functions that it has and which are often the primary functions of the mobile device. For example, a smart phone will have many function other than positioning and a drone will have functions related to its flight. The processor 330 and memory 332 can be shared with some or all of these other functions or be specific to the local positioning operations.

Figure 4:
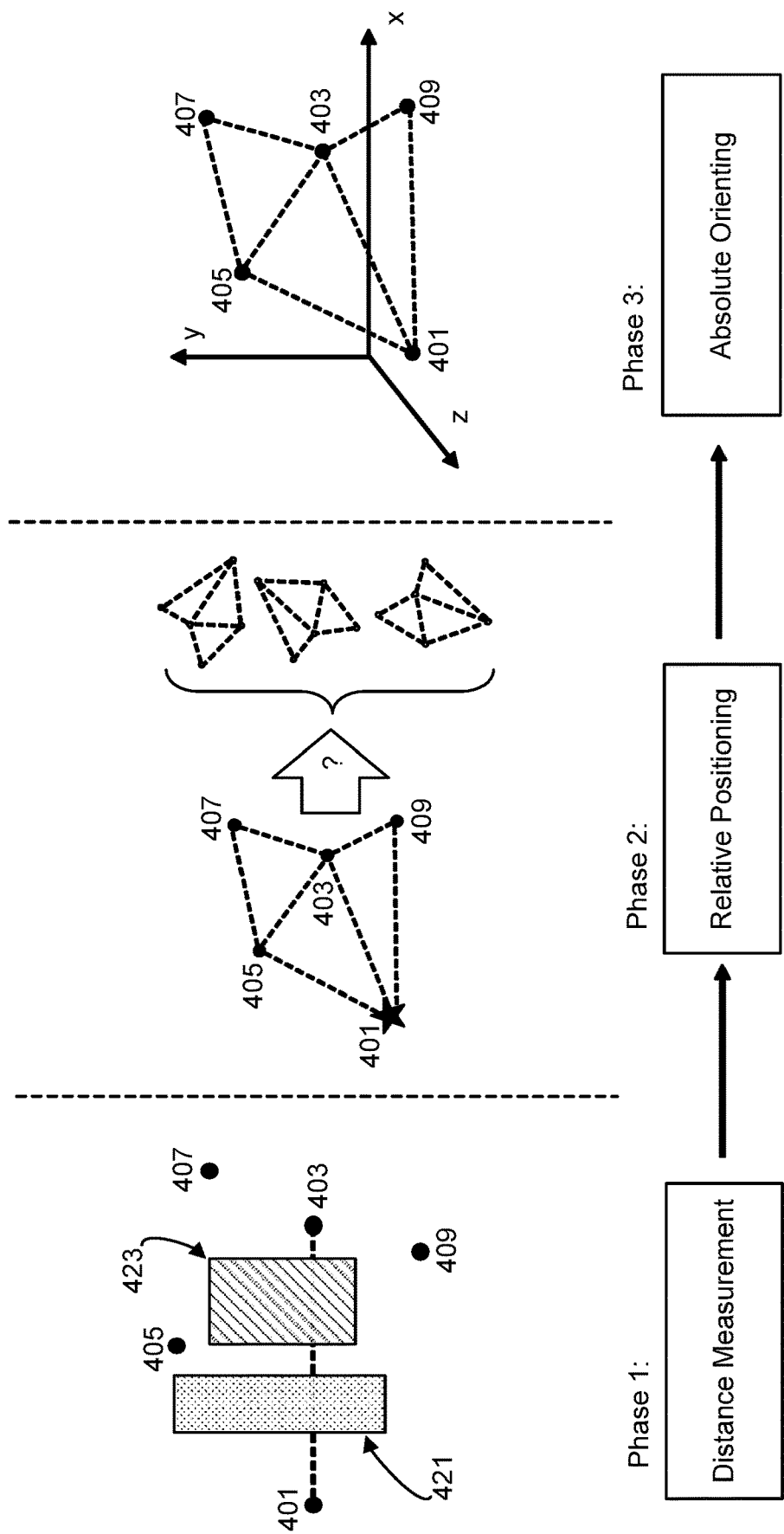
FIG. 4 is a schematic representation of three independent aspects of the positioning process presented here.

FIG. 4 is a schematic representation of three independent aspects of the positioning process presented here. A first phase is distance measuring to obtain pair-wise distances between the nodes (401, 403, 405, 407, 409), such as between node 401 and 403. The distance determination can be penetrating, such as though use of a penetrating signal (e.g., a near-field magnetic signal) that can to some degree pass through the line of sight obstructions 421 and 423, or by the bypassing of obstructions through a collaborative process of the nodes. Phases 2 and 3 can be decoupled from phase 1, which can make each phase easier and allow for different approaches for phases 2 and 3.

The relative positioning of phase 2 obtains the shape of a mesh for the nodes, but only to rigid motion transformations. This is schematically illustrated by showing the mesh to left of the phase 2 portions of FIG. 4, but where, as shown to the right, this mesh may be oriented in various ways in real space. If an absolute orienting of the nodes is wanted, this can be performed in phase 3 to fix the orientation, if needed, in a post-calibration process.

Relative to previous techniques, the embodiments presented here have a number of distinctions. A first is its collaborative nature, where the same functions can be applied for every node, no anchor is needed, and blockages can be bypassed. Another is through the use of on-will participation and broadcast, providing privacy and reduced communications. Additionally, there is a decoupling relative and absolute positioning, which again needs no anchor.

Figure 5:
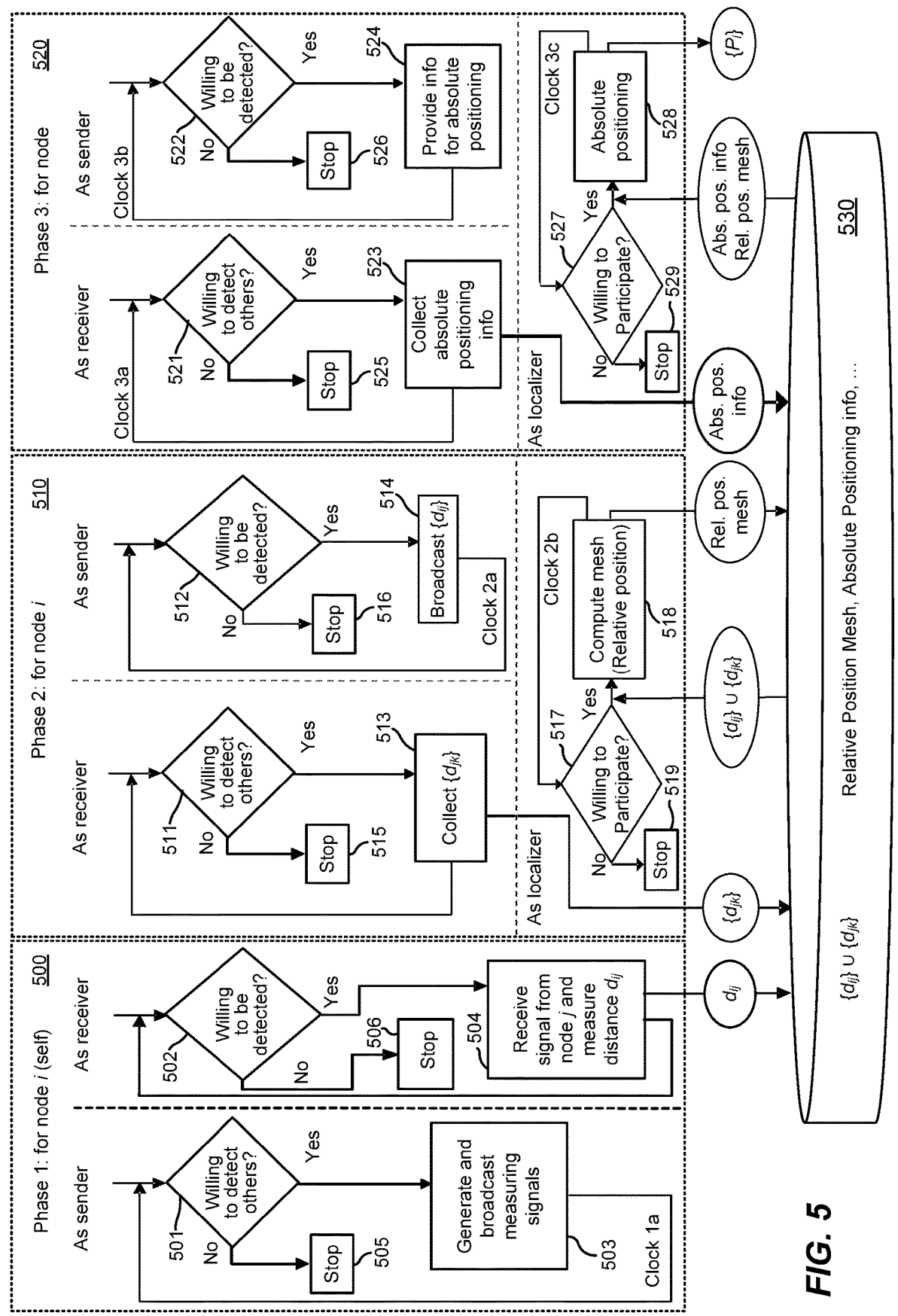
FIG. 5 is a set of flowcharts of providing an overview of one embodiment of the phases of FIG. 4.

FIG. 5 is a set of flowcharts providing an overview of one embodiment of the phases of FIG. 4. The flow charts of block 500 present an embodiment of the distance measurement of phase 1; the flow charts of block 510 present an embodiment of the relative positioning of phase 2; and the flow charts of block 520 present an embodiment of the absolute orienting of phase 3. In each of these, the perspective is with respect to a node i, or "self" node. For each phase, the operation as both sender and receiver is shown, along with the operations as localizer for phases 2 and 3. Each of these phases will be considered in further detail below, but FIG. 5 illustrates many of the concepts at a high level.

Considering the sender flow for node i in phase 1, starting at 501 node i determines whether it is willing to be detected by other devices or nodes in response to a request from another device. If node i is not willing to be detected, the flow goes to 505 and stops. Referring to the embodiment of FIG. 3, the control signal receiver 304 would receive the request to be detected and the control signal transmitter 302 would transmit any reply if node i is willing to participate. Both the control signal receiver 304 and the control signal transmitter 302 operate under control of the processor 330 and transmit and receive the control signals from antenna 308. If node i is willing to detected, the flow goes to 503 and the positioning signal transmitter 312 of node i under control of the processor 330 generates and broadcasts from antenna 318 the positioning signals used for measuring distances between the node i and an accepting device or devices. Once the positioning signals are transmitted at 503, the flow loops back to 501. During this process, the node i operates based a clock signal Clock 1a. The positioning signal is structured such that a sending device and receiving device can operate asynchronously at their own clock rates.

Considering the receiver flow for node i in phase 1, starting at 502 node i receives from another device a control message to see if it is willing to detect positioning signals from the other device. Referring to the embodiment of FIG. 3, the control signal receiver 304 receives the control signal from antenna 308. If node i is not willing to collaborate, the flow goes to 506 and stops. If node i is willing to detect, the flow goes to 504 and the positioning signal receiver 314 of node i receives the positioning signals used for measuring distances between the node i and the transmitting device from antenna 318. Once the positioning signals are received at 504, the flow loops back to 502. From the positioning signals received a node j, the processor 330 can determine the distance between node i and node j, $d_{ij}$. The distance can then be stored in a database 530 for the distance values. This can be the local storage of memory 332 on the node i or any of the other nodes, which need not be shared between the devices. In some embodiments, the $d_{ij}$ values can transmitted and stored separately: for example, in a surveying application it may be convenient for the data to be stored on a separate device, such as a laptop computer used by the surveyors.

Considering phase 2 for node i as a receiver, starting at 511 node i receives a control message to see if it is willing to detect other devices. Referring to the embodiment of FIG. 3, the control signal receiver 304 receives the control signals from antenna 308. If node i is not willing to detect others, the flow goes to 515 and stops. If node i is willing to detect others, the flow goes to 513 and the node i collects the set of distances $\{d_{ij}\}$ between node i and one or more neighboring nodes, that are transferred to the database 530, after which the flow loops back to 511.

For node i as a transmitter in phase 2, starting at 512 node i transmits a control signal to see whether other devices are willing to be detected by node i. If no other devices respond with a yes, the flow goes to 516 and stops. If any other nodes are willing to detect, the flow goes to 514 and node i broadcasts any sets of distances $\{d_{ij}\}$ between node i and one or more of its neighboring nodes to the accepting devices.

Once the $\{d_{ij}\}$ values have been broadcast, the flow loops back to 512, where the node i can be operating at a clock value Clock 2a, which can be the same as or different from Clock 1a, and which can again be different from the on the receiving nodes so that the different devices can operate asynchronously.

Operation as a localizer for node i to determine relative positioning occurs at 517-519, with 517 determining whether node i is willing to participate and, if not, going to stop at 519. If the node i is willing to participate, at 518 the node i accesses the data values of the distances $\{d_{ij}\}$ between it and neighboring nodes j that are available from the database 530 as stored in its memory 332, for example. The node i may also be able to access available relayed data values of the distances $\{d_{jk}\}$ between neighboring nodes j and the neighbor's neighbors' node k. (Relaying is discussed in more detail below with respect to FIGS. 14 and 15.) The processor 330 can then perform a relative positioning by computing a mesh for these nodes, with the relative position mesh being stored as part of the data base 530. The process continues to loop back through 517 and 518 as long as node i continues to be willing to participate, running at Clock 2b, which can the same of different from either of Clock 1a and Clock 2a.

For the absolute orienting flows 520 for node i, starting as a receiver at 521 with node i determining if it is willing to detect others. If node i is not willing to detect others, the flow goes to 525 and stops. If node i is willing to be detected, the flow goes to 523 and the node i collects absolute positioning information, that is transferred to the database 530, after which the flow loops back to 511 running at Clock 3a. Clock 3a (and 3b and 3c) can be the same as or independent of any of Clocks 1a, 2a and 2b.

For node i as a sender in phase 3, starting at 522 node i transmits a control signal to see whether other devices are willing to be detected by node i. If no other devices respond with a yes, the flow goes to 526 and stops. If any other nodes are willing to be detected, the flow goes to 524 and node i provides information for absolute positioning to the other nodes willing to be detected at 524.

Operation as a localizer for node i to determine relative positioning occurs at 527-529, with 527 determining whether node i is willing to participate and, if not, going to stop at 529. If willing to participate, at 528 the node i accesses the absolute positioning information and relative position mesh. The processor 330 can then perform absolute positioning for the nodes to provide their absolute positions $\{P_i\}$. The process continues to loop back through 527 and 528 as long as node i continues to be willing to participate.

FIGS. 6A-10 look at one implementation of the collaborative distance measuring phase (phase 1) in more detail. More specifically, FIGS. 6A and 6B are more detailed versions of section 500 of FIG. 5.

FIG. 6A is a flowchart of one embodiment of the operation of a mobile device or node $S_i$ as a sender in a collaborative distance measuring process. Starting at 601, the node $S_i$ determines whether it is willing to participate in distance measuring with one or more other devices that are detected by their control signals. If not, the flow goes to 603 and stops without participating in distancing operations. The mobile device's processor can make this determination based upon settings on the device, such as a user's privacy settings. Other operations on the mobile device can continue uninterrupted.

If the node $S_i$ is willing to participate, it will transmit a sequence, or "mini-batch", of positioning signals. Referring to FIG. 3, the sequence of positioning signals can be generated by the processor 330 and transmitted by positioning signal transmitter 312 over positioning antenna 318. The generation of the sequence of positioning signals begins at 605 with the setting of an initial counter value that corresponds to the number of signals in the sequence or mini-batch. In this example, the mini-batch will be a sequence of 3 signals, but other numbers can be used and more generally some integer number N of signals can be used. The use of a larger number of signals can provide more accuracy, but require more computation. In many applications, the use of 3 signals in the sequence is a reasonable compromise. From 605, the flow of FIG. 6A moves in to loop to transmit the sequence running at a Clock 1b, where the outer loop from 613 back to 601 runs at a Clock 1a, where the two clocks can be the same or independent.

Moving from 605 into the inner loop, at 607 the message of the current positioning signal is encoded. In this embodiment, each message M will include an identification of the transmitting node, $ID(S_i)$, so that the receiving device knows the transmitting device with which to identify the message. The message also includes an indication, a, of the amplitude at which the message is transmitted so that a receiving device can compare the amplitude of the transmitted signal with the amplitude of the received signal in the distance determination. The message will also include the current counter value, so that the receiving device can place a given signal within the sequence. The encoded message from 605 in this embodiment is then:

$$M = <ID(S_i), a, \text{Counter}>.$$

The message is then broadcast at 609.

The counter value is then incremented at 611 and its value checked at 613. If the counter is 0, the sequence is complete and flow loops back to 601. If the counter has reached 0 and there are more messages in the mini-batch, the flow loops back 607 to encode the next message.

FIG. 6B is a flowchart of one embodiment of the operation of a mobile device or node $R_i$ as a receiver in a collaborative distance measuring process. Starting at 621, the node $R_i$ determines whether it is willing to participate in distance measuring with one or more other devices that are detected by their control signals. If not, the flow goes to 623 and stops, not participating in distancing operations. The mobile device's processor can make this determination based upon settings on the device, such as a user's privacy settings. Other operations on the mobile device can continue uninterrupted.

If the mobile device is willing to participate, it receives a positioning signal message at 625 and, if several messages are received, picks between them. The amplitude of the message as received, a' is measured at 627 and the message decoded at 629. Referring back to FIG. 3, the message of the positioning signal can be received over antenna 318 at the positioning signal receiver 314, with the measurement of 627 and other processes at 629, 631, 633, and 635 being performed by the processor 330. In decoding the message, the amplitude a as transmitted is extracted and compared to the amplitude a' measured at 627 and associated with the $ID(S_j)$ of the transmitting device $S_j$ and the corresponding counter value.

At 631 the decoded messages from the different messages in the sequence are aggregated, with 633 determining from the counter values of the messages whether the mini-bath is complete. If the sequence is not complete, the flow loops back 625 for the next message in the sequence. If the sequence of the mini-batch is complete, the flow continues on to 635 and the distance between the receiving node $R_i$ and the transmitting node $S_j$ is inferenced to provide $d_{ij}$ at 637.

Figure 8:
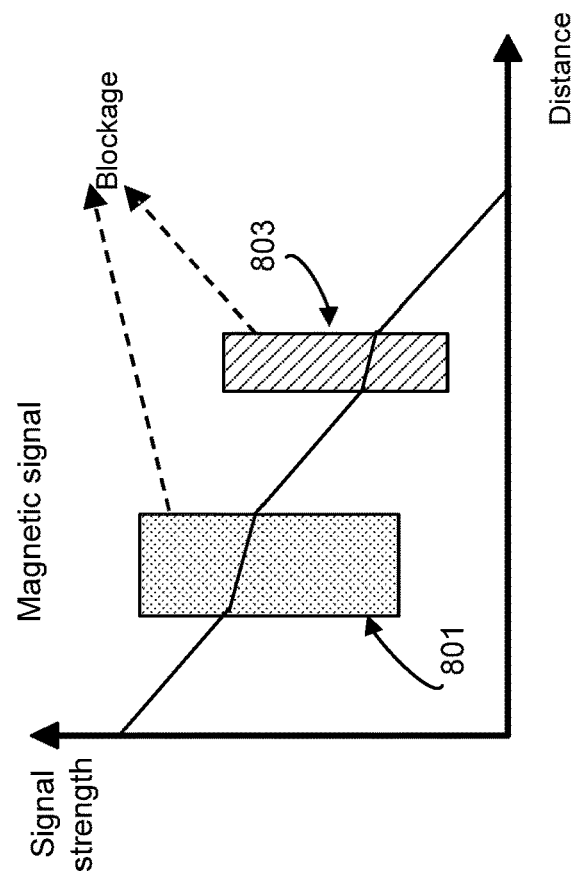
FIGS. 7 and 8 respectively illustrate several sequences of positioning signals as a function of time and the attenuation of signals as a function of distance where there is blockage present.
Figure 7:
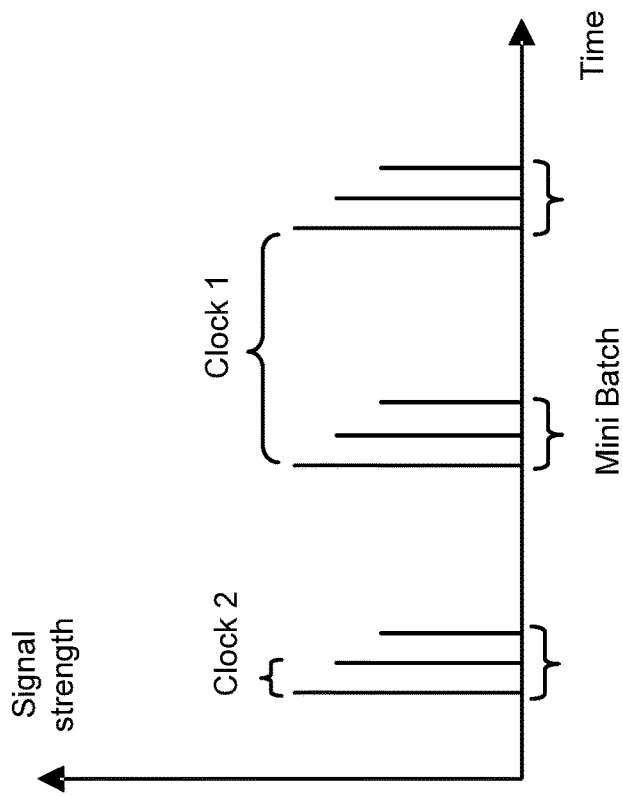

FIGS. 7 and 8 respectively illustrate several sequences of positioning signals as transmitted as a function of time and the attenuation of signals as a function of distance where there is blockage present. FIG. 7 illustrates the transmission of 3 sequences, or mini-batches, of 3 messages. The messages of each sequence are separated by a time of Clock 2, with the mini-batches separated by a time of Clock 1, until the sender stops. Within each mini-batch, the amplitude of the signals can vary for each message, with the amplitude as transmitted (a) is included in the message, as using signals of differing amplitudes can be used to generate a more accurate distance determination, particularly in the presence of blockages in the path. In the embodiment illustrated in FIG. 7 the amplitudes progressively decrease, but other embodiments can use different arrangements such as an increasing amplitude sequence.

FIG. 8 illustrates the attenuation of the message's signal strength, showing the amplitude as a function of distance for an embodiment using a magnetic positioning signal. As illustrated, the amplitude a' at the receiver decays with distance, so that a comparison of the received amplitude a' with the transmitted amplitude a can allow the mobile device's processor 330 to determine the separation distance of the devices. FIG. 8 illustrates two blockages 801 and 803 in the path between the devices, such as a metal blockage 801 and a wooden blockage 803. As illustrated, a magnetic signal is a penetrating signal that decays slower in a solid blockage than in air. Other embodiments can employ other signal types for the positioning signal, such as Bluetooth, as many devices already have the ability to generate such signals. For embodiments using non-penetrating signals, in the case of line-of-sight blockage the distance can be determined collaboratively by way of third devices.

Figure 9:
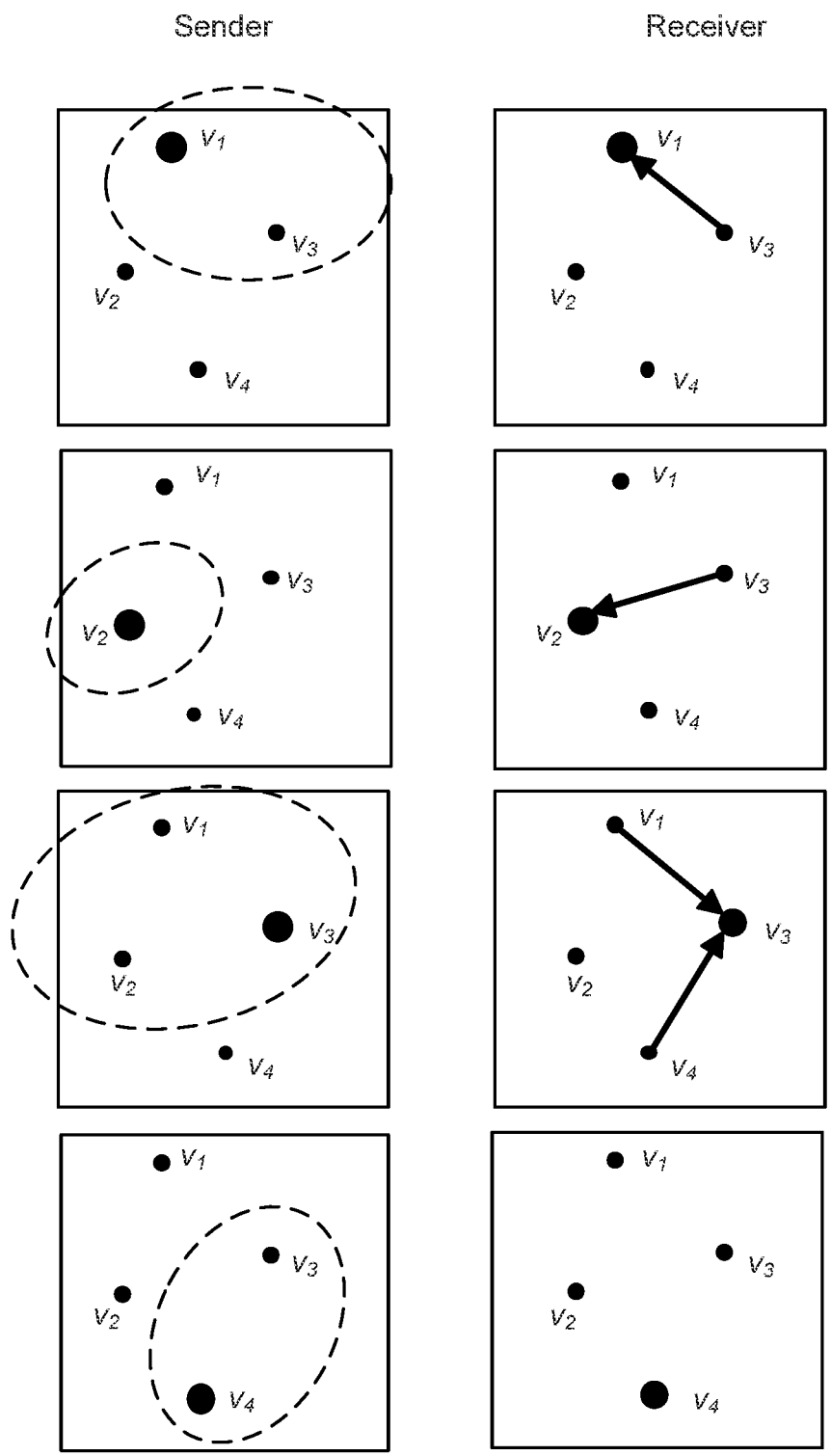
FIGS. 9 and 10 considers a set of four nodes as both senders and receivers at two times.
Figure 10:
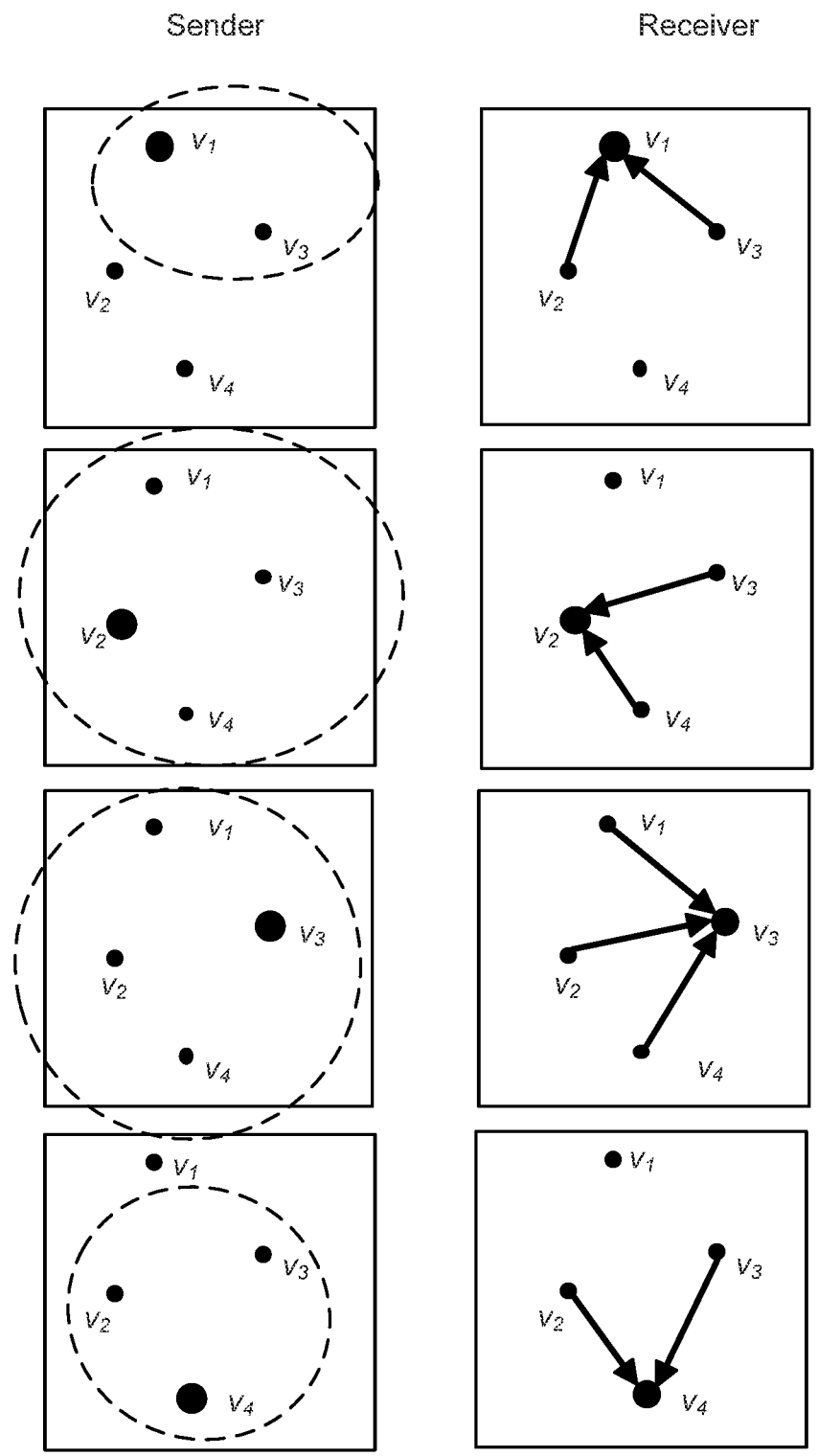

FIGS. 9 and 10 considers a set of four nodes ($v_1$, $v_2$, $v_3$, $v_4$) as both senders and receivers at respective times $t_1$ and $t_2$. Considering FIG. 9, at a time $t_1$ the left hand columns successively looks at each of $v_1$, $v_2$, $v_3$, and $v_4$ and which of the other nodes are within range and willing to cooperate. In each case the range of the node indicated by the larger dot is illustrated by the broken line oval. At top for node $v_1$, only node $v_3$ is in range; and in the case of $v_2$ none of the other nodes are in range. For $v_3$ at $t_1$, both of $v_1$ and $v_2$ are in range. Note that the capabilities of each device can differ, so that the situation is not symmetric; for example, $v_3$ can send a receivable signal to $v_2$, but $v_2$ cannot transmit and be received by $v_3$ at $t_1$. For $v_4$, only $v_3$ is reachable.

The right hand column of FIG. 9 looks at each of the nodes from the receiver perspective, starting with node $v_1$ at top. As a receiver, $v_1$ is able to receive the sequence of positioning signals only from $v_3$, which is also the case for $v_2$. The node $v_3$ can receive from both $v_2$ and $v_4$, while $v_4$ is not able to receive from any of the other shown nodes.

FIG. 10 is arranged similarly to FIG. 9, but showing the nodes at a different time of $t_2$. At time $t_2$, the situation as both sender and receiver can have changed for each of the nodes, both due to movement of the individual nodes and other changes in the signal paths, such as differences in blockages. As sender, $v_1$ can still only reach $v_3$, but both $v_2$ and $v_3$ can now reach all the other three nodes and $v_4$ can reach $v_2$ and $v_3$. As a receiver, both of $v_1$ and $v_4$ can receive from $v_2$ and $v_3$; $v_2$ can receive from $v_3$ and $v_4$; and $v_3$ can receive all three of the other nodes.

As illustrated in FIGS. 9 and 10, each of the nodes willing to participate can act as both a transmitter or sender $S_i$ to broadcast a measuring signal and a receiver $R_i$ to compute the distance by comparing the amplitudes as transmitted with the amplitudes as sent. A sender's broadcast range varies from node to node ($S_i$ vs $S_j$) and from time to time ($S_i^{t1}$ vs $S_i^{t2}$). Similarly, a receiver's measured neighborhood varies from node to node ($R_i$ vs $R_j$) and from time to time ($R_i^{t1}$ vs $R_i^{t2}$).

Figure 11:
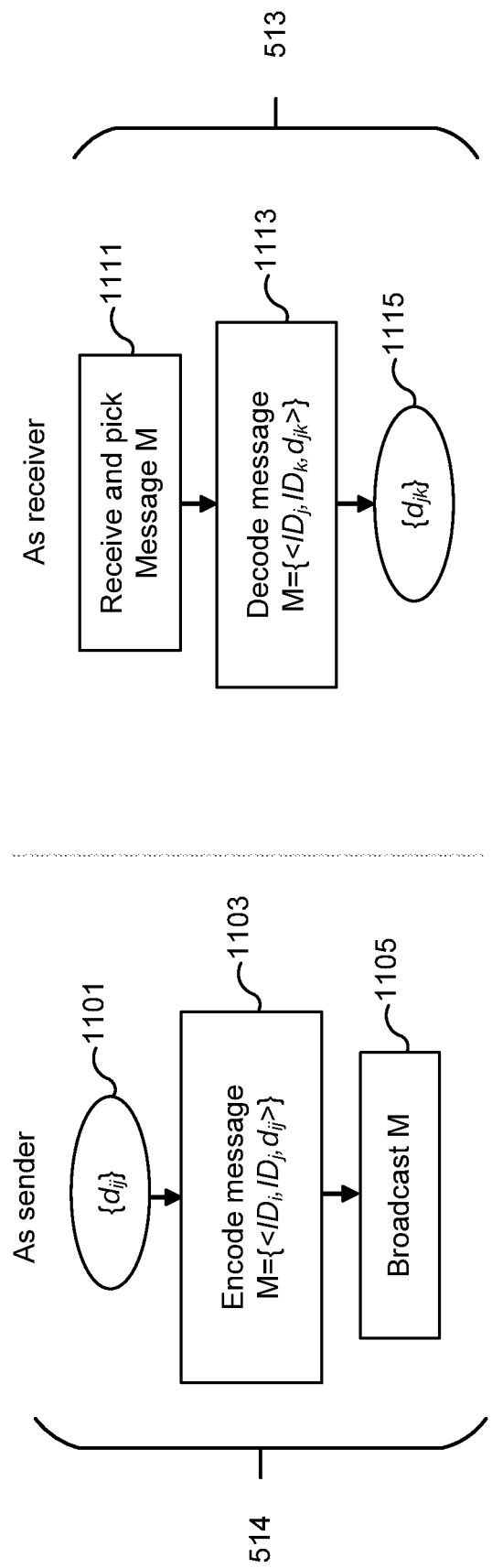
FIG. 11 is a flowchart of one embodiment of the operation of a mobile device as a sender and as a receiver during collaborative local positioning.
Figure 12:
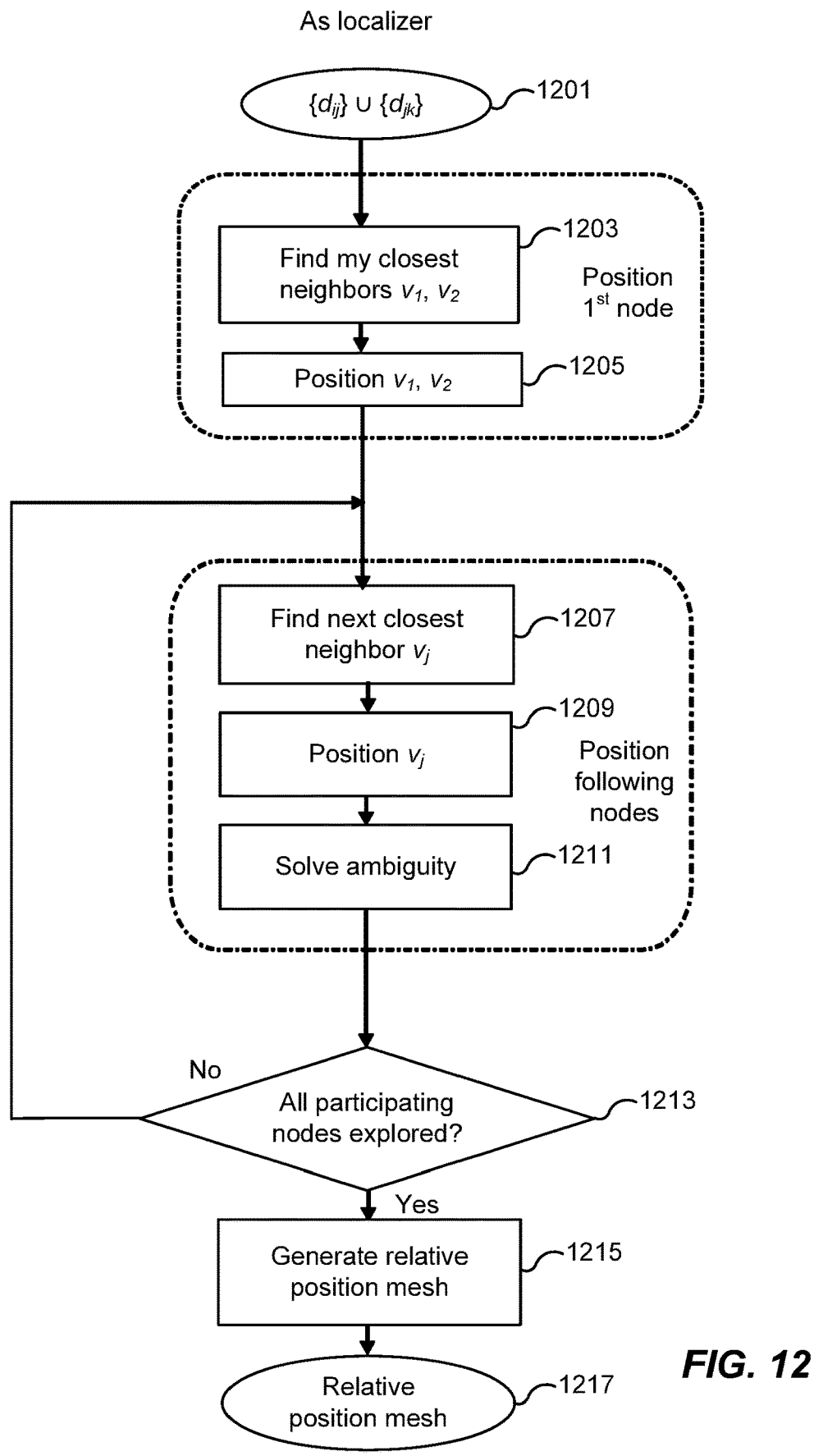
FIG. 12 is a flowchart of one embodiment of the operation of a mobile device as a localizer during collaborative local positioning.

FIGS. 11-15 look at one implementation of the collaborative local positioning phase (phase 2) in more detail. More specifically, FIG. 11 provides more detail of 513 of the receiver section and of 514 of the sender sections of block 510 of FIG. 5 and FIG. 12 provides more detail of the localizer section of block 510 of FIG. 5.

FIG. 11 is a flowchart of one embodiment of the operation of a mobile device as a sender (on left) and as a receiver (on right) during collaborative local positioning. On the left of FIG. 11, the process as sender corresponds to additional detail on the broadcasting of distances at 514 on FIG. 5. Beginning at 1101 the distances $\{d_{ij}\}$ are determined by the mobile device at node i with any other participating nodes j. The distances are encoded into a message at 1103, where the message can be structured include the distance and the identification of the two devices between which the distance was determined for each of the distances:

$$M=\{<ID_i,ID_j,d_{ij}>\}.$$

The message is then broadcast at 1105.

On the right of FIG. 11 the process as receiver corresponds to additional detail on the collecting of distances at 513 on FIG. 5. Beginning at 1111 the receiver receives the messages and, if multiple messages are available, chooses between them. The messages are decoded at 1113, allowing for the set of distances=$\{d_{ij}\}$ to be extracted at 1115 and provided to database 530.

FIG. 12 is a flowchart of one embodiment of the operation of a mobile device as a localizer during collaborative local positioning. Beginning at 1201, the collection of distances is collected from the databased 530. With this information, a first node (the localizing device) can be positioned by finding the localizing device's two closest neighbors ($v_1$, $v_2$) at 1203, which are then positioned at 1205.

Once the first node is positioned, the following nodes are then localized. At 1207 the next closest neighbor v; is determined and then, at 1209, positioned. If there is ambiguity in the positioning, this is solved at 1211. At 1213 it is determined whether all of the participating nodes have been explored and, if not, the flow loops back to 1207 for the next node. If all of the participating nodes have been explored, the flow moves from 1213 to 1215 to generate a relative position mesh for the nodes. The determined relative position mesh is provided to the data base 530 at 1217.

FIGS. 13A and 13B consider the positioning process of FIG. 12 in more detail, with FIG. 13A being a flowchart of one embodiment of the positioning operation at a receiving mobile device A and FIG. 13B being a graphic representation of the process. In this example, the closest neighbors to A are nodes B and C, as determined at 1301 of FIG. 13A and represented graphically at 1302 of FIG. 13B that illustrates the relative placement of the nodes A, B, and C. For finding the closest nodes to A, A itself is at its own location so that $(0,0) \rightarrow A$. Determining a closest node B can be determined by individually considering the distances $d_{AB}$ from A to the different nodes, $(d_{AB}, 0) \rightarrow B$. Determining the closest node C can be determined based on looking at the difference between A and B, $\Delta(A,B)+C$, where either one of the results can be picked.

At 1303, the next closest node D to A is determined. This is illustrated at 1304 of FIG. 13B, where the lighter broken lines between A, B, and C indicate that these nodes have already been determined, while the darker broken lines highlight that node D is to be determined. D can be determined by finding the node D closest to the line $\overline{AB}$ by looking at the delta, $\Delta(A,B)$. If there are multiple possibilities, say D' and D", two such differences are determined. C, where C≠A/B/D, is chosen such that $\text{ArgMin}_{D \in (D', D'')} |\overline{CB} - d_{CD}|$, returning either D' or D", whichever gives a smaller value for the argument of the function.

The process continues at 1305 to determine a next closest node E to A, as is illustrated at 1306 of FIG. 13B. Similarly to 1303, E can be determined by finding the node E closest to the line $\overline{BC}$ by looking at the delta, $\Delta(B,C)$. If there are multiple possibilities, say E' and E", two such differences are determined. D, where D≠B/C/E, is chosen such that $\text{ArgMin}_{E \in (E', E'')} |\overline{DE} - d_{DE}|$, returning either E' or E", whichever gives a smaller value for the argument of the function. If additional nearest nodes are to be determined, this can be done as for 1303 and 1305.

Once all of the participating nodes are determined, the flow moves on to 1307 to determine the relative position of the nodes in a virtual coordinate system. As illustrated in 1308 of FIG. 13B, this places the mesh of 1306 onto the virtual coordinates (w,u).

Figure 14:
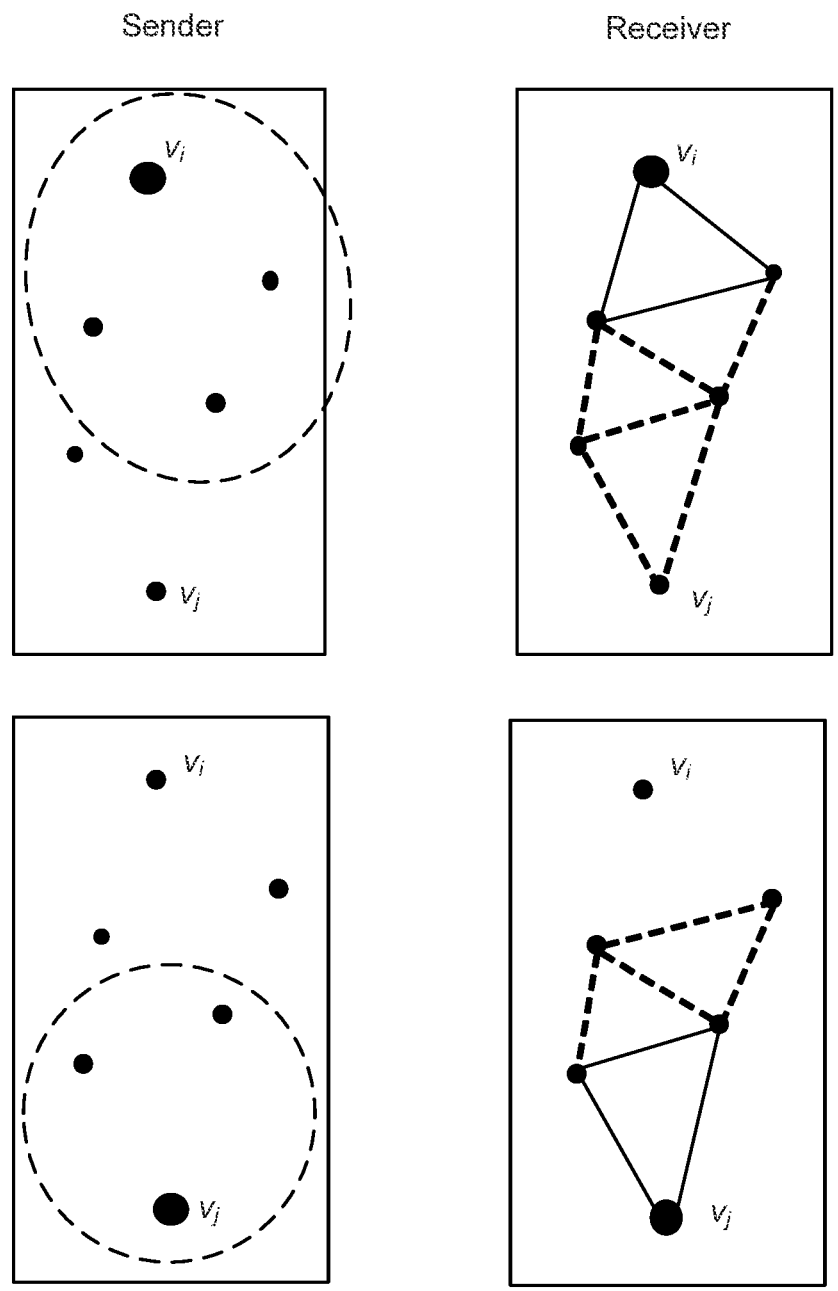
FIGS. 14 and 15 provide further illustration of how a mesh can be constructed through a combination of broadcasting and relay.
Figure 15:
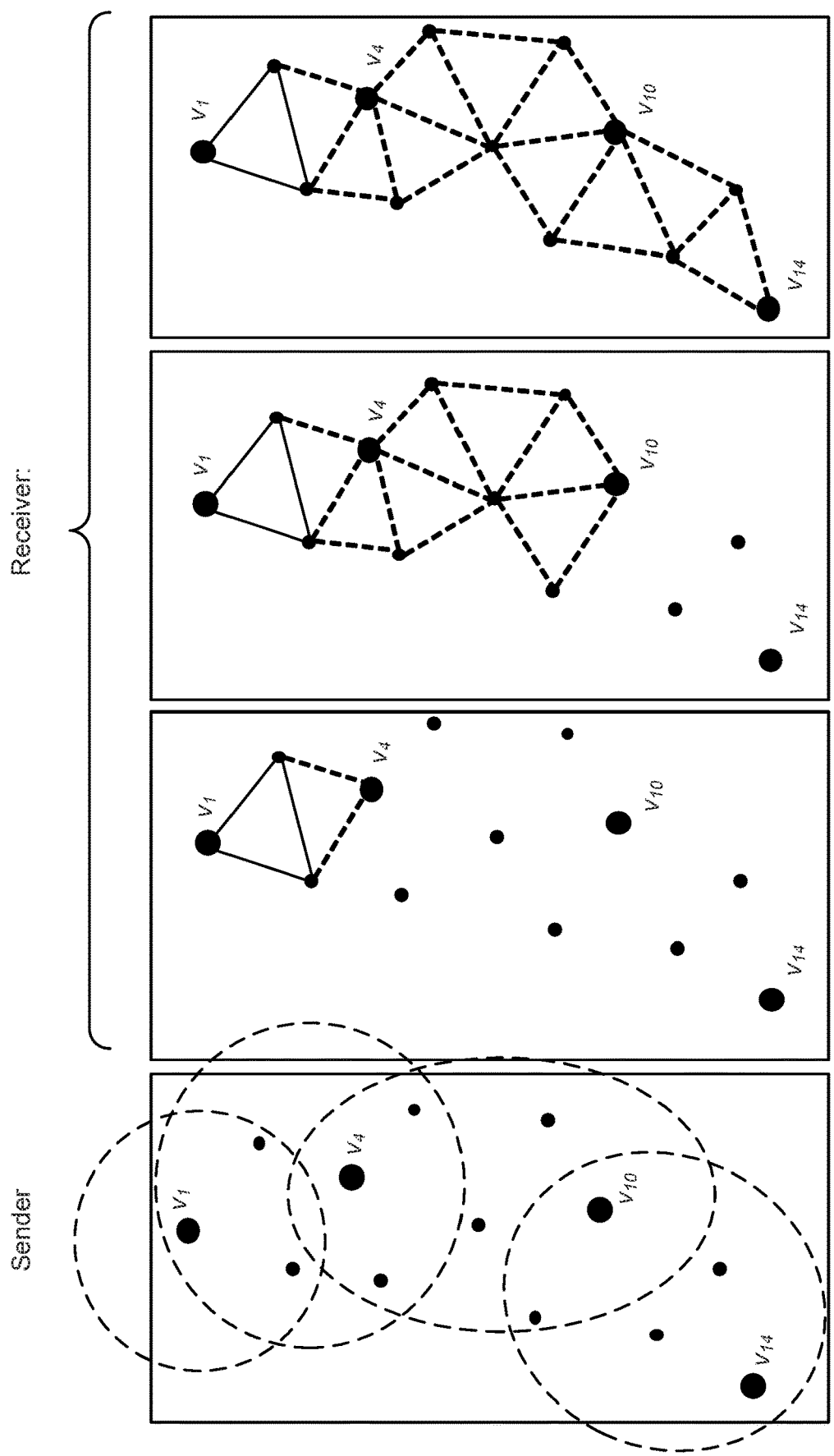

FIGS. 14 and 15 provide further illustration of how a mesh can be constructed through a combination of broadcasting and relay. In order to determine a relative positioning mesh, a mobile device can use both the distances that it determines itself based upon received positioning signals from other nodes and also use distances determined by other devices at other nodes that are relayed over the control signal channel. On the left FIG. 14 illustrates a number of nodes, including nodes $v_i$ and $v_j$ at which are located respective sending devices $S_i$ and $S_j$. The broadcast range for the devices varies, as represented by the broken line ovals.

On the right FIG. 14 illustrates the same set of nodes as receivers. In the receiver diagrams of FIG. 14 the solid lines correspond to the distances that can be directly measured by a receiver $R_i$ at node $v_i$ at top, and the distances that can be directly measured by a receiver $R_j$ at node $v_j$ below. The broken lines correspond to distances that can broadcast to the receivers $R_i$ at node $v_i$ and $R_j$ at node $v_j$. As illustrated at top, a receiver $R_i$ at node $v_i$ is able to obtain distances values for all of the shown nodes, while receiver $R_j$ at node $v_j$, which has a shorter broadcast range, is not able to obtain distances for $v_1$ through either direct measurement or relay.

FIG. 15 illustrates how a relative positioning mesh can be extended through relay for a set of nodes. At far left FIG. 15 illustrates the situation as a sender, where the range for senders at nodes $v_1$, $v_4$, $v_{10}$, and $v_{14}$ is again represented by the broken line ovals. For sender $S_i$ at node $v_1$ both the range and broadcasted content can vary.

The next three diagrams of FIG. 15 show the same set of nodes as a receiver from the perspective of a receiver, illustrating how for a receiver $R_1$ at node $v_1$ the mesh varies if sender broadcast differently. The first of the receiver diagrams illustrates the case for when there is no relay, the set of distances $\{d_{ij}\}$ available to $R_1$ are only those than can be directly measures or broadcast from $v_4$, as $v_1$ is within of range of a sender $S_4$ at $v_4$.

The middle receiver diagram of FIG. 15 illustrates the use of partial relay, where the distances $\{d_{ij}\}$ available to $R_i$ in the no relay case are now extended to include part of the set of distances $\{d_{jk}\}$ available only through relay. As node $v_4$ is within range of a sender $S_{10}$ at node $v_{10}$, sender $S_{10}$ can broadcast distances to $S_4$, which can then relay these on to $R_1$ at $v_1$. The final receiver diagram of FIG. 15 illustrates the when all of the distances of the set of nodes can be relayed, extending the relay of the set of distances $\{d_{jk}\}$ from a sender $S_{14}$ at node $v_{14}$ on to node $v_{10}$, from node $v_{10}$ on to node $v_4$, and finally on to the receiver $R_1$ at node $v_1$. Through use of such relays, a relative position mesh can then be determined by the processor 330 on a mobile device at node $v_1$.

FIGS. 16-21 look at implementations of the absolute orienting phase (phase 3 of FIG. 4) in more detail. In the preceding phase, a relative positioning mesh for a set of nodes is established, but the global orientation of the mesh is still unknown. In the relative positioning mesh, the nodes are places within a virtual coordinate system. For absolute orientation, the mesh needs to be embedded into a physical coordinate system.

Figure 16:
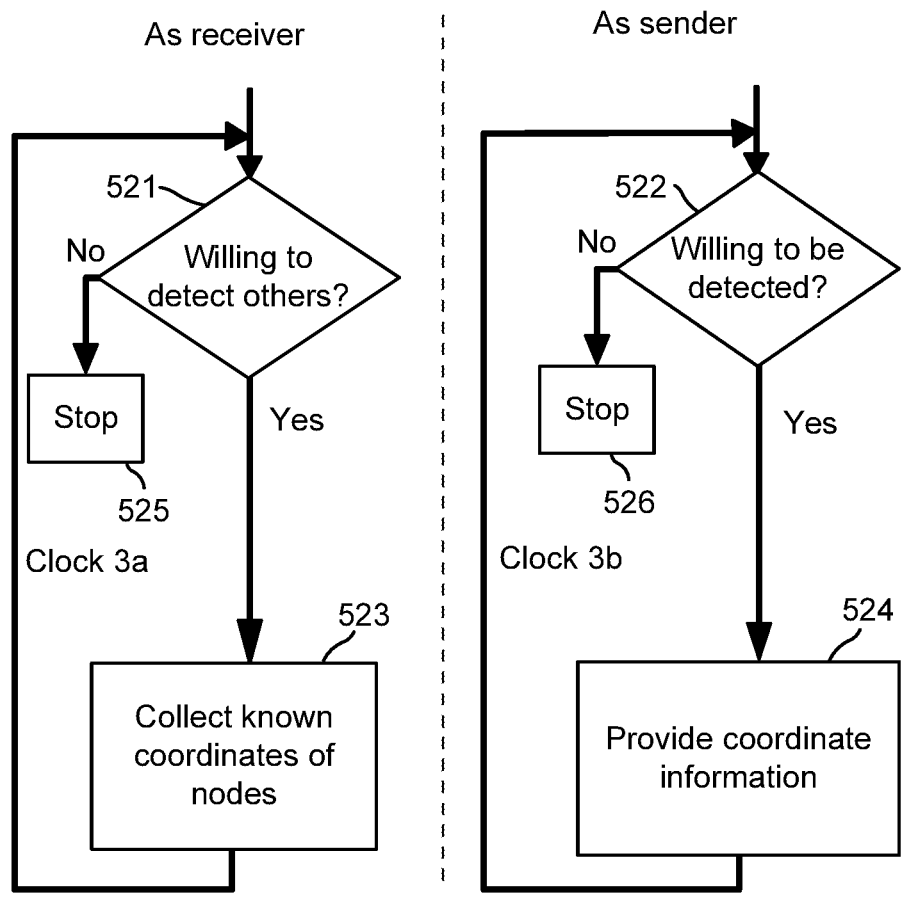
FIGS. 16-18 correspond to block 520 of FIG. 5 for three different embodiments of the localizer process.
Figure 16:
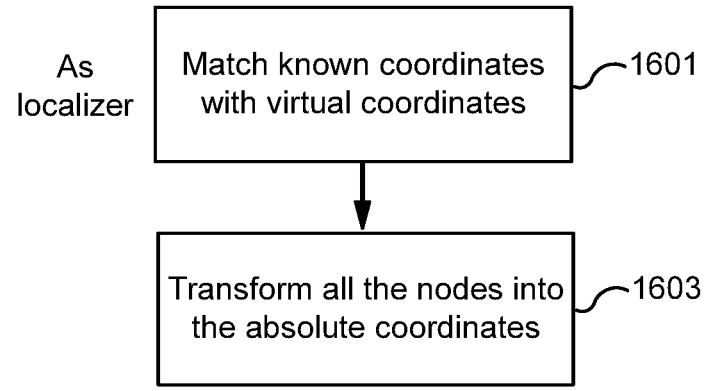
Figure 17:
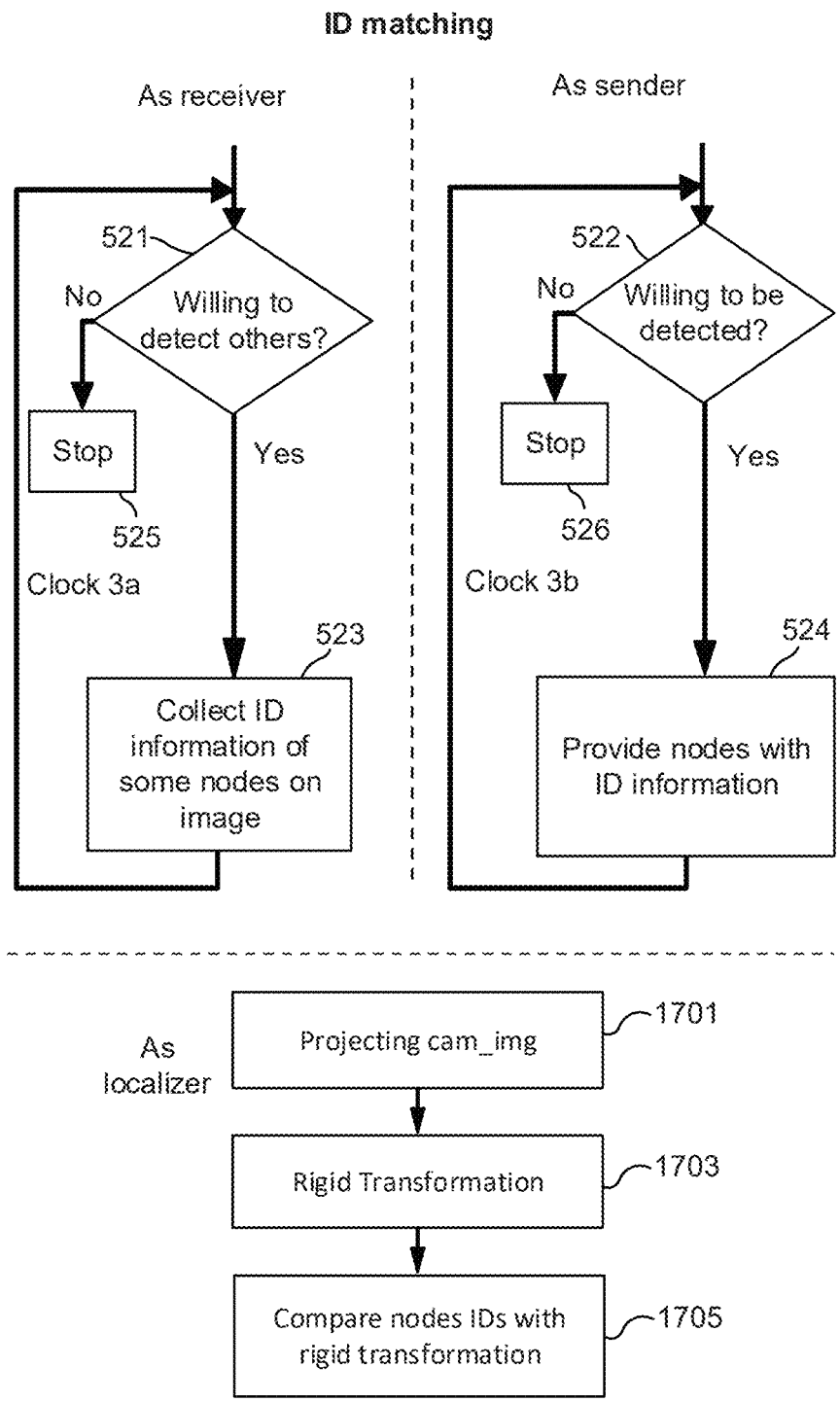
Figure 18:
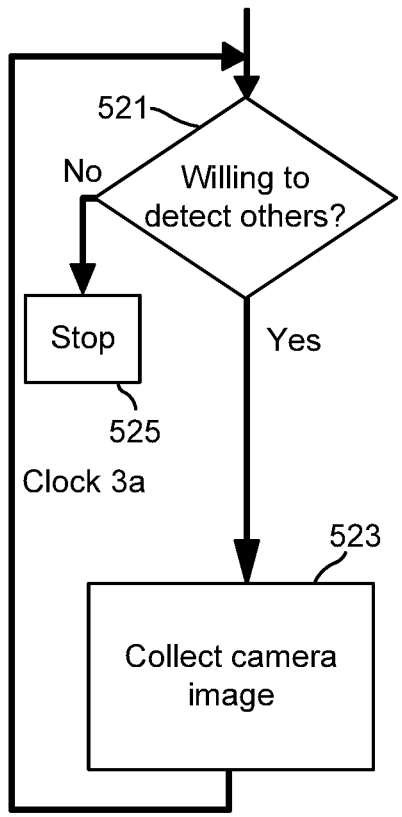
Figure 18:
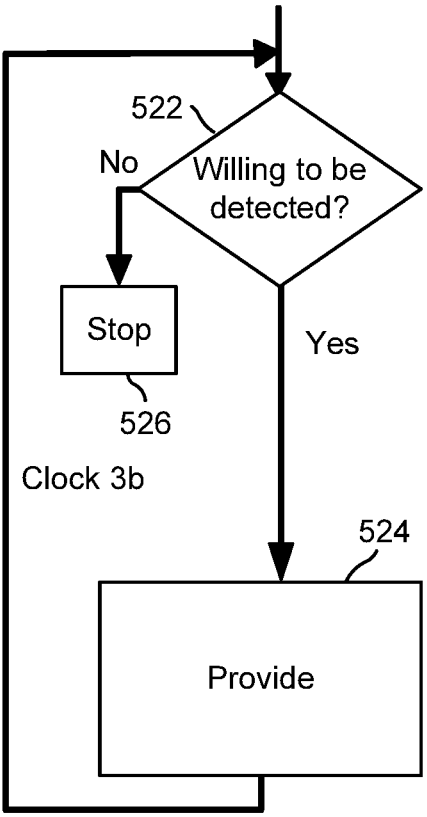
Figure 18:
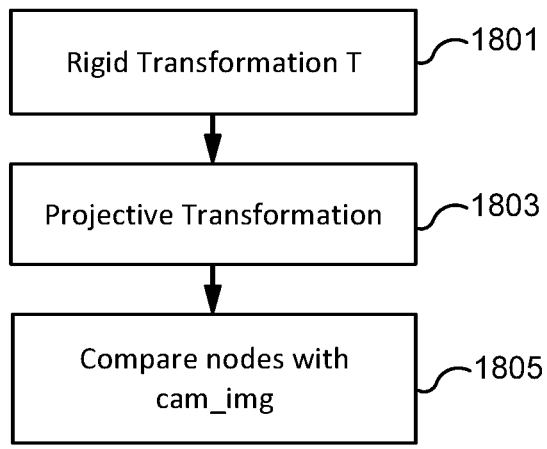

FIGS. 16-18 correspond to block 520 of FIG. 5 for three different embodiments of the localizer process. Each of FIGS. 16-18 repeats the sender and receiver portions of block 520 of FIG. 5, but respectively present position matching, ID matching, and image matching embodiments for the localizer block.

The embodiment of FIG. 16 uses position matching, where, if the absolute coordinates of nodes in the relative positioning mesh are known, these can be used for placing the mesh into a physical coordinate system. For a two-dimensional absolute orientation, the absolution coordinates are needed for two or more nodes of the mesh; and for a three-dimensional absolute orientation, the absolution coordinates are needed for three or more nodes of the mesh. At 1601, for nodes with known absolute coordinates, these are matched with the virtual coordinates of the nodes in the relative positioning mesh. This allows for the position all of the nodes of the mesh to be transformed into absolute coordinates at 1603. This process can be illustrated with respect to FIG. 19.

Figure 19:
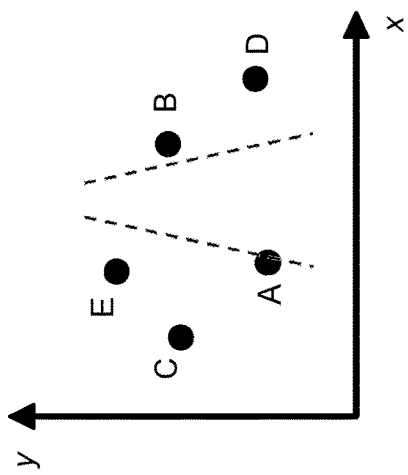
FIG. 19 is a schematic represent of the placement of a relative positioning mesh of nodes into an absolute coordinate system by position matching of nodes.
Figure 19:
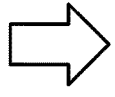
Figure 19:
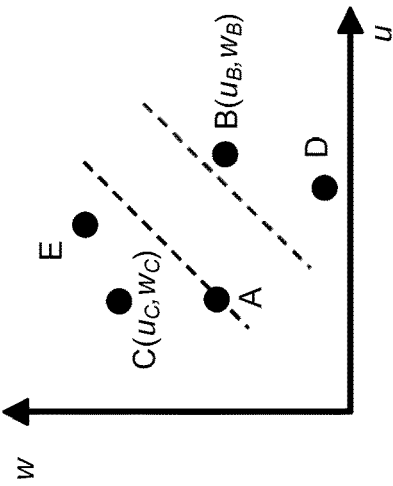

FIG. 19 is a schematic represent of the placement of a relative positioning mesh of nodes into an absolute coordinate system by position matching of nodes. At left, a set of nodes A, B, C, D, E are positioned in a virtual coordinate system (w,u). (FIG. 19, and similarly FIGS. 20 and 21 discussed below, are shown in a two-dimensional representation for simplicity of representation, but can be extended to a three-dimensional case.) The nodes B and C positions in the virtual coordinate system are $B(u_B, q_B)$ and $C(u_C, w_C)$. If the position of these nodes is known in an actual coordinate system (x,y), the coordinates of these points can be transformed:

$$B(u_B, w_B) \rightarrow (x_B, y_B);$$

$$C(u_C, w_C) \rightarrow (x_C, y_C);$$

This information can then be used to determine the transformation from the (u,w) coordinate system to the (x,y) coordinate system, where use of more nodes of the mesh for which absolute coordinates are available can provide increased accuracy. With this information, the position of the other nodes can be transformed into the (x,y) system as shown at right in FIG. 19.

The embodiment of FIG. 17 uses ID matching as a localizer for absolute orienting of a relative positioning mesh. This embodiment can be used if no (or insufficient) information on nodes' absolute coordinates is available, but if some of the nodes can provide ID information in camera images. At 1701, the mobile device at a node projects a camera image (cam_img) onto the nodes by performing a projective transformation of the image onto the nodes. A rigid transformation to the mesh is then made at 1703 to align the nodes as in the image with the relative positioning mesh. After the rigid transformation of the nodes at 1703, the nodes are compared to the relative positioning mesh to have their IDs matched, providing an absolute orienting of the relative positioning mesh.

Figure 20:
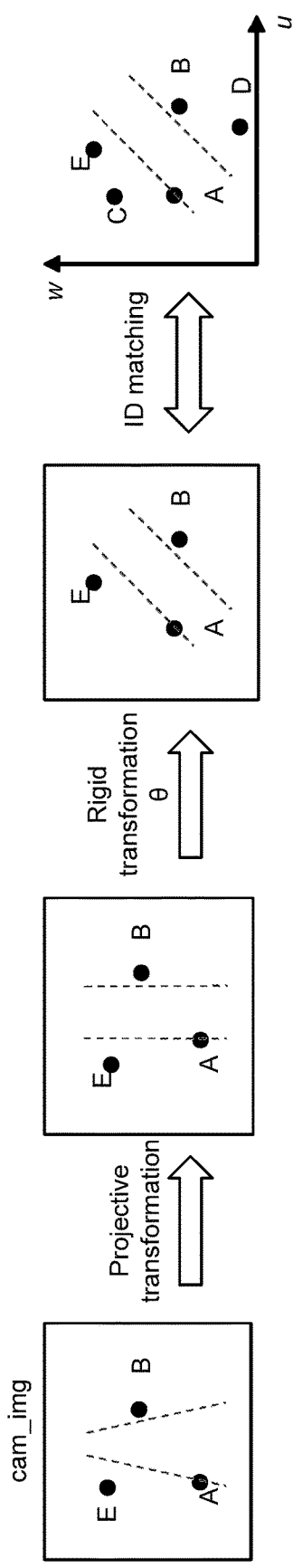
FIG. 20 is a schematic represent of the flow of FIG. 17.

FIG. 20 is a schematic representation the ID matching of the flow of FIG. 17. Starting at left, the mobile device has a camera image, cam_img, that it can have generated itself or otherwise received that includes the mobile device (at node A) and other nodes of the mesh (nodes B and E in this example). A projective transformation is then made to align the image with actual coordinates, followed by a rigid transformation through an angle θ to align the mesh in actual coordinates with the previously relative positioning mesh. Once aligned by the rigid transformation, the nodes from the image cam_img (A, B, E in this example) have their IDs matched with the relative positioning mesh. This allows for the relative positioning mesh to be absolutely oriented.

FIG. 18 uses image matching as a localizer for absolute orienting of a relative positioning mesh and can be used if no (or insufficient) information on nodes' absolute coordinates is available and if no (or insufficient) IDs are available for the nodes. At 1801, the relative positioning mesh in a virtual coordinate system (w,u) is subjected to a rigid transformation to align the mesh with a coordinate system (w',u') to orient the mesh. A projective transformation at 1803 then takes the mesh from the (w',u') coordinate system to the absolute coordinate system (x,y). After the projective transformation of 1803, a partial matching of the nodes of the mesh with available nodes from an image cam_img is then made at 1805.

Figure 21:
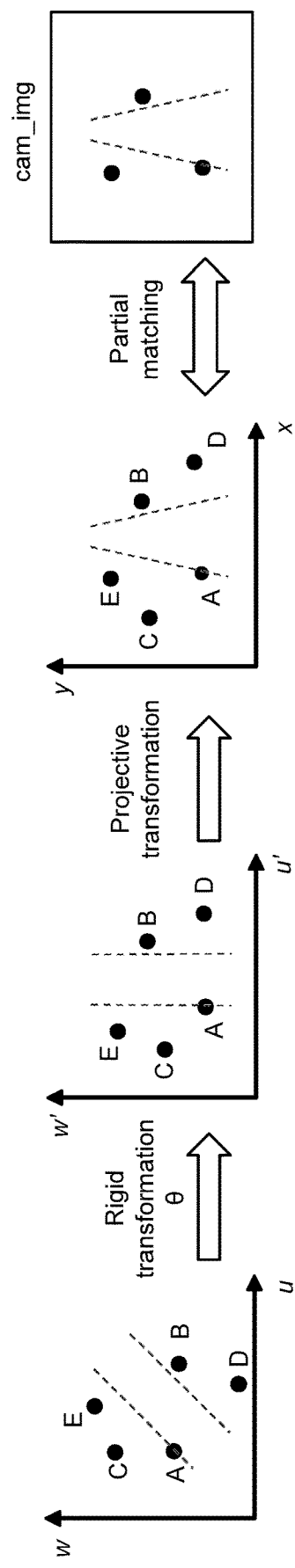
FIG. 21 is a schematic represent the image matching of the flow of FIG. 18.

FIG. 21 is a schematic represent the image matching of the flow of FIG. 18. Starting at left with the relative positioning mesh in the virtual coordinate system (w,u), the mesh is rotated through a rigid transformation of an angle θ to align the mesh with a coordinate system (w',u'). A projective transformation brings the rotated mesh into the (x,y) coordinate system. After the projective transformation of the mesh, a camera image cam_img that includes some of the nodes is used to match those nodes with the mesh. The partial matching can then be used to extract the absolute orientation of the mesh and the actual coordinates of the nodes.

Depending on the embodiment, the techniques described above can implemented on the one or more processors of processor 330 of FIG. 3 or on other processors in communication with the mobile device 301. Certain embodiments of the present technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does not include propagated, modulated, or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or phases, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "coupled" or "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A positioning system, comprising:
   a first mobile device, comprising:
      one or more receivers configured to receive sequences of positioning signals from one or more additional devices, each sequence of positioning signals including a plurality of signals each including an identifier of the one or more additional devices from which at least one of the plurality of signals is transmitted, an indication of an amplitude of the signal as transmitted by the additional device, and a count value designating position of the signal within the received sequences of positioning signals; and
      one or more processors coupled to the one or more receivers, the one or more processors configured to:
         receive a first sequence of positioning signals from a first of the one or more additional devices;
         determine an amplitude of each positioning signal of the first sequence as received at the first mobile device;
         for each of the received positioning signals of the first sequence, compare the determined amplitude of the positioning signal as received with the indication of the amplitude of the signal as transmitted; and
         determine from the comparing for each of the received positioning signals of the first sequence a distance from the first mobile device to the first of the additional devices.

2. The positioning system of claim 1, the first mobile device further comprising:
   one or more transmitters configured to transmit control signals to the one or more additional devices, wherein the one or more receivers are further configured to receive control signals from one or more additional mobile devices, and wherein the one or more processors are coupled to the one or more transmitters, the one or more processors further configured, prior to receiving the first sequence of positioning signals from the first of the additional devices, to:
      receive a first request from the first of the additional devices to accept sequences of positioning signals therefrom; and
      transmit a reply to the first request accepting reception of sequences of positioning signals from the first of the additional devices.

3. The positioning system of claim 1, the first mobile device further comprising:
   one or more transmitters configured to transmit sequences of positioning signals each including a plurality of signals each including an identifier of the first mobile device, an indication of the amplitude of the signal as transmitted by the first mobile device, and a count value designating position of the signal within the sequence of positioning signals.

4. The positioning system of claim 3, wherein the positioning system further includes:
   a second mobile device, the first of the additional devices being the second mobile device, comprising:
      one or more transmitters configured to transmit the first sequence;
      one or more receivers configured to receive sequences of positioning signals transmitted by the first mobile device; and
      one or more processors coupled to the one or more receivers and configured to receive the sequences of positioning signals transmitted by the first mobile device and determine therefrom a distance to the first mobile device; and
   a third mobile device, comprising:
      one or more transmitters configured to transmit a second sequence of positioning signals, wherein the one or more receivers of the first mobile device are further configured to receive the second sequence and the one or more processors of the first mobile device are further configured to determine from the second sequence a distance from the first mobile device to the third mobile device.

5. The positioning system of claim 4, wherein the one or more transmitters of the first mobile device are further configured to transmit to the second mobile device the distance from the first mobile device to the third mobile device and to transmit to the third mobile device the distance from the first mobile device to the second mobile device.

6. The positioning system of claim 5, wherein the one or more receivers of the first mobile device are further configured to receive from one or both of the second and third mobile devices a distance between the second mobile device and the third mobile device, and
wherein the one or more processors of the first mobile device are further configured to:
determine relative positions of the first mobile device, the second mobile device, and the third mobile device from the distance from the first mobile device to the second mobile device, the distance from the first mobile device to the third mobile device, and the distance between the second mobile device and the third mobile device.

7. The positioning system of claim 6, wherein the one or more processors of the first mobile device are further configured to determine an absolution position of the first mobile device, the second mobile device, and the third mobile device by matching a position of the first mobile device to the absolution position.

8. The positioning system of claim 7, wherein the first mobile device further includes:
a camera connected to the one or more processors of the first mobile device, wherein the one or more processors of the first mobile device are configured to determine the absolution position of the first mobile device, the second mobile device, and the third mobile device based on an image from the camera.

9. The positioning system of claim 1, wherein the sequence of positioning signals is a magnetic signal or a Bluetooth signal, and wherein the first mobile device is a mobile telephone, a surveying device, a drone, a robotic device, or an inventory tracking device.

10. A position determination method, comprising:
receiving, at a first mobile device, a first sequence of positioning signals including a plurality of signals, each of the plurality of signals including an identifier of a second mobile device from which at least one of the plurality of signals is transmitted, an indication of an amplitude of the signal as transmitted by the second mobile device, and a count value designating position of the signal within the first sequence of positioning signals;
determining an amplitude of each positioning signal of the first sequence as received at the first mobile device;
for each of the received positioning signals of the first sequence, comparing the determined amplitude of the positioning signal as received with the indication of the amplitude of the signal as transmitted; and
determining from the comparing for each of the received positioning signals of the first sequence a distance between the first mobile device and the second mobile device.

11. The method of claim 10, further comprising, prior to receiving the first sequence of positioning signals at the first mobile device:
receiving, at the first mobile device, a first request from the second mobile device to accept sequences of positioning signals therefrom; and
transmitting from the first mobile device a reply to the first request accepting reception of sequences of positioning signals from the second mobile device.

12. The method of claim 11, further comprising:
receiving, at the first mobile device, a second sequence of positioning signals including a plurality of signals each including an identifier of a third mobile device from which the signal is transmitted, an indication of an amplitude of the signal as transmitted by the third mobile device, and a count value designating position of the signal within the sequence of positioning signals;
determining an amplitude of each positioning signal of the second sequence as received at the first mobile device;
for each of the received positioning signals of the second sequence, comparing the determined amplitude of the positioning signal as received with the indication of the amplitude of the signal as transmitted;
determining from the comparing for each of the received positioning signals of the second sequence a distance between the first mobile device and the third mobile device; and
receiving at the first mobile device a distance between the second mobile device and the third mobile device from one of the second mobile device and the third mobile device.

13. The method of claim 12, further comprising:
determining, by the first mobile device, relative positions of the first mobile device, the second mobile device, and the third mobile device from the distance from the first mobile device to the second mobile device, the distance from the first mobile device to the third mobile device, and the distance between the second mobile device and the third mobile device.

14. The method of claim 13, further comprising:
determining, by the first mobile device, absolute positions of the first mobile device, the second mobile device, and the third mobile device from the relative positions of the first mobile device, the second mobile device, and the third mobile device; and
determining, by the first mobile device, the absolute positions of the first mobile device, the second mobile device, and the third mobile device includes matching a position of the first mobile device to an absolution position.

15. The method of claim 14, wherein determining, by the first mobile device, the absolute positions of the first mobile device, the second mobile device, and the third mobile device includes:
obtaining an image by a camera on the first mobile device; and
determining, by the first mobile device, the absolute positions of the first mobile device, the second mobile device, and the third mobile device based on the image.

16. A positioning system, comprising:
a plurality of mobile devices, each comprising:
a transmitter configured to transmit a sequence of positioning signals including a plurality of positioning signals, each of the plurality of signals each including an identifier of the mobile device, an indication of an amplitude of a positioning signal as transmitted, and a count value designating position of the positioning signal within the sequence of positioning signals;

a receiver configured to receive the sequence of positioning signals from others of the plurality of mobile devices; and one or more processors coupled to the transmitter and the receiver and configured to determine an amplitude of each of the positioning signals of a received sequence, perform for each positioning signal of the received sequence a comparison of the determined amplitude of the positioning signal as received with the indication of the amplitude as transmitted, and determine from the comparisons a distance between the mobile device receiving the sequence of positioning signals and the mobile device transmitting the sequence of positioning signals.

17. The positioning system of claim 16, wherein, for each of the mobile devices:

the transmitter is further configured to transmit a request to accept the sequence of positioning signals to the other of the plurality of mobile devices and to reply to a request to accept the sequence of positioning signals from another of the plurality of mobile devices;

the receiver is further configured to receive the request to accept the sequence of positioning signals from the another of the plurality of mobile devices; and the one or more processors are further configured to transmit the sequence of positioning signals to the another of the plurality of mobile devices in response to the another of the plurality of mobile devices accepting the request to accept the sequence of positioning signals.

18. The positioning system of claim 17, wherein the plurality of mobile devices includes a first mobile device, a second mobile device, and a third mobile device, wherein one or both of the second mobile device and the third mobile device are configured to transmit distance therebetween to the first mobile device, and the one or more processors of the first mobile device are further configured to determine relative positions of the first mobile device, the second mobile device, and the third mobile device from the distances between the first and second mobile devices, the first and third mobile devices, and the second and third mobile devices.

19. The positioning system of claim 18, wherein the one or more processors of the first mobile device are further configured to determine an absolution position of the first mobile device, the second mobile device and the third mobile device by matching a position of the first mobile device to an absolution position.

20. The positioning system of claim 18, wherein the first mobile device further includes:

a camera connected to the one or more processors of the first mobile device, wherein the one or more processors of the first mobile device are configured to determine an absolution position of the first mobile device, the second mobile device, and the third mobile device based on an image from the camera.

* * * * *

UNITED STATES PATENT AND TRADEMARK OFFICE
CERTIFICATE OF CORRECTION

PATENT NO. : 12,306,324 B2
APPLICATION NO. : 17/857934
DATED : May 20, 2025
INVENTOR(S) : Xiaotian Yin et al.

Page 1 of 1

It is certified that error appears in the above-identified patent and that said Letters Patent is hereby corrected as shown below:

In the Claims

Column 20, Claim 16, Lines 58-67, through Column 21, Lines 1-13, should read:
16. A positioning system, comprising:
    a plurality of mobile devices, each comprising:
        a transmitter configured to transmit a sequence of positioning signals including a plurality of positioning signals, each of the plurality of signals including an identifier of the mobile device, an indication of an amplitude of a positioning signal as transmitted, and a count value designating position of the positioning signal within the sequence of positioning signals;
        a receiver configured to receive the sequence of positioning signals from others of the plurality of mobile devices; and
        one or more processors coupled to the transmitter and the receiver and configured to determine an amplitude of each of the positioning signals of a received sequence, perform for each positioning signal of the received sequence a comparison of the determined amplitude of the positioning signal as received with the indication of the amplitude as transmitted, and determine from the comparisons a distance between the mobile device receiving the sequence of positioning signals and the mobile device transmitting the sequence of positioning signals.

Signed and Sealed this
Eighth Day of July, 2025

Coke Morgan Stewart
*Acting Director of the United States Patent and Trademark Office*